United States Patent
Neumann et al.

(10) Patent No.: US 11,830,249 B2
(45) Date of Patent: *Nov. 28, 2023

(54) AUGMENTED REALITY, COMPUTER VISION, AND DIGITAL TICKETING SYSTEMS

(71) Applicant: eBay Inc., San Jose, CA (US)

(72) Inventors: Steven Robert Neumann, Orinda, CA (US); Marcus Walter Shelksohn, San Francisco, CA (US); Khashayar Dehdashtinejad, Walnut Creek, CA (US); Jonathan Xiaohang Zhang, Castro Valley, CA (US); Edward Tang, Alameda, CA (US); Garrett Canan Reeb, San Francisco, CA (US); Ninglin Li, Foster City, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,580

(22) Filed: Aug. 18, 2021

(65) Prior Publication Data

US 2021/0383118 A1 Dec. 9, 2021

Related U.S. Application Data

(63) Continuation of application No. 16/243,716, filed on Jan. 9, 2019, now Pat. No. 11,126,846.

(Continued)

(51) Int. Cl.
*G06V 20/20* (2022.01)
*G06F 16/29* (2019.01)
(Continued)

(52) U.S. Cl.
CPC ........... *G06V 20/20* (2022.01); *G01C 21/005* (2013.01); *G01C 21/20* (2013.01); *G01C 21/206* (2013.01);
(Continued)

(58) Field of Classification Search
CPC ...... G06V 20/20; G06V 20/63; G01C 21/005; G01C 21/20; G01C 21/206;
(Continued)

(56) References Cited

U.S. PATENT DOCUMENTS 6,504,571 B1  1/2003  Narayanaswami et al.
6,736,322 B2  5/2004  Gobburu et al.
(Continued)

FOREIGN PATENT DOCUMENTS

CN  1488067  4/2004
CN  101159014 A  4/2008
(Continued)

OTHER PUBLICATIONS

Final Office Action received for U.S. Appl. No. 16/243,716, dated Apr. 7, 2020, 17 pages.
(Continued)

*Primary Examiner* — Motilewa Good-Johnson
(74) *Attorney, Agent, or Firm* — FIG. 1 Patents

(57) ABSTRACT

Augmented reality, computer vision, and digital ticketing system techniques are described that employ a location determination system. In one example, the location determination system is configured to receiving at least one digital image as part of a live camera feed, identify an object included in the at least one digital image using object recognition, determine a location of the object in relation to a digital map of a physical environment, generate augmented reality digital content indicating the determined location in relation to the digital map, and render the augmented reality digital content as part of the live camera feed for display by a display device.

19 Claims, 29 Drawing Sheets

Related U.S. Application Data

(60) Provisional application No. 62/619,071, filed on Jan. 18, 2018.

(51) Int. Cl.
| | | |
|---|---|---|
| *G06F 16/532* | (2019.01) | |
| *G01C 21/20* | (2006.01) | |
| *G06F 16/58* | (2019.01) | |
| *G06N 20/00* | (2019.01) | |
| *G06Q 30/0601* | (2023.01) | |
| *G06Q 10/02* | (2012.01) | |
| *G06F 16/583* | (2019.01) | |
| *G01C 21/00* | (2006.01) | |
| *G01C 21/36* | (2006.01) | |
| *G06V 20/62* | (2022.01) | |

(52) U.S. Cl.
CPC ..... *G01C 21/3602* (2013.01); *G01C 21/3679* (2013.01); *G06F 16/29* (2019.01); *G06F 16/532* (2019.01); *G06F 16/5846* (2019.01); *G06F 16/5866* (2019.01); *G06N 20/00* (2019.01); *G06Q 10/02* (2013.01); *G06Q 30/0623* (2013.01); *G06Q 30/0641* (2013.01); *G06Q 30/0643* (2013.01); *G06V 20/63* (2022.01)

(58) Field of Classification Search
CPC . G01C 21/3602; G01C 21/3679; G06F 16/29; G06F 16/532; G06F 16/5846; G06F 16/5866; G06N 20/00; G06Q 10/02; G06Q 30/0623; G06Q 30/0641; G06Q 30/0643

See application file for complete search history.

(56) References Cited

U.S. PATENT DOCUMENTS

| | | | | |
|---|---|---|---|---|
| 8,624,725 | B1* | 1/2014 | MacGregor | H04W 12/06 342/450 |
| 9,037,513 | B2 | 5/2015 | Rosenblatt et al. | |
| 9,177,280 | B2 | 11/2015 | Nielsen et al. | |
| 9,286,711 | B2 | 3/2016 | Geisner et al. | |
| 9,310,205 | B2 | 4/2016 | Xu et al. | |
| 9,432,421 | B1 | 8/2016 | Mott et al. | |
| 9,467,809 | B2* | 10/2016 | Lopez | H04W 4/023 |
| 9,875,258 | B1* | 1/2018 | Hsiao | G06F 16/532 |
| 10,489,410 | B2 | 11/2019 | Sharifi et al. | |
| 10,606,824 | B1 | 3/2020 | Fire et al. | |
| 10,713,831 | B2* | 7/2020 | Arana | G06T 11/60 |
| 10,884,098 | B2* | 1/2021 | Han | H04W 4/024 |
| 11,126,846 | B2 | 9/2021 | Neumann et al. | |
| 11,429,428 | B2* | 8/2022 | Douglas | G06F 9/4843 |
| 2001/0018660 | A1 | 8/2001 | Sehr | |
| 2003/0069829 | A1 | 4/2003 | Gathman et al. | |
| 2007/0127848 | A1 | 6/2007 | Kim et al. | |
| 2008/0312824 | A1 | 12/2008 | Jung | |
| 2010/0002941 | A1 | 1/2010 | Fonseca et al. | |
| 2011/0164163 | A1 | 7/2011 | Bilbrey et al. | |
| 2011/0221771 | A1 | 9/2011 | Cramer et al. | |
| 2012/0033032 | A1 | 2/2012 | Kankainen | |
| 2012/0078667 | A1 | 3/2012 | Denker et al. | |
| 2012/0092372 | A1 | 4/2012 | Ryu et al. | |
| 2012/0099800 | A1 | 4/2012 | Llano et al. | |
| 2012/0176525 | A1 | 7/2012 | Garin et al. | |
| 2013/0045751 | A1* | 2/2013 | Chao | G01C 21/3602 455/456.1 |
| 2013/0086077 | A1 | 4/2013 | Piippo et al. | |
| 2014/0046802 | A1* | 2/2014 | Hosein | G06Q 30/0623 705/26.61 |
| 2014/0111542 | A1 | 4/2014 | Wan | |
| 2014/0188527 | A1 | 7/2014 | Oxenham et al. | |
| 2014/0188528 | A1 | 7/2014 | Oxenham et al. | |
| 2014/0195277 | A1* | 7/2014 | Kim | G08B 5/221 705/5 |
| 2014/0337174 | A1 | 11/2014 | Lin et al. | |
| 2015/0109338 | A1 | 4/2015 | Mckinnon et al. | |
| 2015/0287119 | A1 | 10/2015 | Bhan et al. | |
| 2016/0131487 | A1* | 5/2016 | Xu | H04W 4/029 701/408 |
| 2016/0140147 | A1 | 5/2016 | Sun | |
| 2016/0148417 | A1 | 5/2016 | Kim et al. | |
| 2016/0189416 | A1 | 6/2016 | Naguib et al. | |
| 2016/0232228 | A1* | 8/2016 | Copsey | G06F 16/58 |
| 2016/0249167 | A1* | 8/2016 | Jagannath | H04W 4/029 |
| 2017/0213377 | A1* | 7/2017 | Torii | H04N 23/60 |
| 2017/0287059 | A1* | 10/2017 | Shelksohn | G06F 3/0346 |
| 2017/0372390 | A1 | 12/2017 | Lokesh | |
| 2017/0372551 | A1* | 12/2017 | Bruce | G06Q 10/02 |
| 2018/0300916 | A1* | 10/2018 | Barnett | G06Q 10/10 |
| 2019/0094027 | A1* | 3/2019 | Xu | G06T 7/248 |
| 2019/0102922 | A1 | 4/2019 | Gum | |
| 2019/0220665 | A1 | 7/2019 | Neumann et al. | |
| 2020/0050906 | A1* | 2/2020 | Mathai | G06V 20/20 |
| 2022/0204170 | A1* | 6/2022 | Tsaliah | B64C 39/024 |

FOREIGN PATENT DOCUMENTS

| | | |
|---|---|---|
| CN | 101996253 A | 3/2011 |
| CN | 103020184 A | 4/2013 |
| CN | 104573735 | 4/2015 |
| CN | 104981820 | 10/2015 |
| CN | 105009163 A | 10/2015 |
| JP | 2017041105 | 2/2017 |
| WO | 2014041353 A2 | 3/2014 |
| WO | 2019/143839 A1 | 7/2019 |

OTHER PUBLICATIONS

Final Office Action received for U.S. Appl. No. 16/243,716, dated Apr. 13, 2021, 25 pages.
Non Final Office Action received for U.S. Appl. No. 16/243,716, dated Oct. 14, 2020, 14 pages.
Non-Final Office Action received for U.S. Appl. No. 16/243,716, dated Nov. 5, 2019, 18 pages.
Notice of Allowance received for U.S. Appl. No. 16/243,716, dated Jul. 12, 2021, 9 pages.
International Written Opinion received for PCT Application No. PCT/US2019/014043, dated Jun. 4, 2019, 8 pages.
International Preliminary Report on Patentability received for PCT Application No. PCT/US2019/014043, dated Jul. 30, 2020, 10 pages.
International Search Report received for PCT Application No. PCT/US2019/014043, dated Jun. 4, 2019, 7 pages.
19704120.5 , "Communication Pursuant to Article 94(3) EPC", EU Application No. 19704120.5, dated Jan. 14, 2022, 5 pages.
201980006726.7 , "Foreign Office Action", CN Application No. 201980006726.7, dated Feb. 25, 2023, 10 pages.
201980006726.7 , "Foreign Office Action", CN Application No. 201980006726.7, dated Jun. 1, 2023, 10 pages.
201980006726.7, "Foreign Office Action—Official Copy", CN Application No. 201980006726.7, 6 pages.

* cited by examiner

AUGMENTED REALITY, COMPUTER VISION, AND DIGITAL TICKETING SYSTEMS

RELATED APPLICATIONS

This application claims priority to U.S. patent application Ser. No. 16/243,716, filed Jan. 9, 2019, entitled "Augmented Reality, Computer Vision, and Digital Ticketing Systems," which claims priority under 35 U.S.C. § 119(e) to U.S. Provisional Patent Application No. 62/619,071, filed Jan. 18, 2018, entitled "Augmented Reality, Computer Vision, and Digital Ticketing Systems," the entire disclosures of which is hereby incorporated by reference.

BACKGROUND

Live events are generally organized and held in large venues that are difficult to navigate. Individuals may find it challenging to accurately identify the location of the venues that host events and require further assistance upon reaching the venues. Specifically, individuals may need assistance navigating through various areas within these venues in order to find their seats, purchase food items and other merchandise, use various venue facilities, and find their way back to their seats. Additionally, users may need guidance in navigating through areas around the venues, e.g. from the parking lot to the entrance etc.

Conventional tools and techniques that assist in such navigation are ineffective because these tools and techniques are fractured across a variety of devices and applications. Additionally, these tools lack location determining functionalities that function effectively within venues due to lack of a signal or inadequate signal strength. Consequently, individuals' ability to comfortably attend and enjoy live events at large venues is frustrated and renders computing devices that include these functionalities inoperable.

SUMMARY

Augmented reality, computer vision, and digital ticketing techniques are described that are configured to facilitate user navigation within and around physical environments via a computing device. A location determination system, as implemented by the computing device described herein, is configured to receive at least one digital image as part of a live camera feed of a physical environment. From this digital image, the location determination system determines a location with respect to a digital map of the physical environment. This may be performed in a variety of ways.

In a first example, text from an object captured in the digital image is recognized, e.g., using text recognition and object recognition. The text, in this example is indicative of a location, e.g., a sign indicating a corresponding section in a stadium, which is used to directly determine a location with respect to a digital map. In a second example, the text alone is not indicative of a location, but is usable as part of a search to find a location, e.g., by recognizing a name of a store, concession stand, and so forth. The text in this second example, for instance, may identify the object but not the location. In a third example, an object that does not include text is recognized, and subsequently used as part of a search to determine the location, e.g., objects of a concession stand indicating that a user is likely positioned next to a stand, a statute at a sports stadium, and so forth.

From this, the location determination system determines a location of the object in relation to a digital map of a physical environment. Then, the system generates an augmented reality based digital content that indicates the likely object location in relation to the digital map. This augmented reality based digital content assists users in traversing areas within the venue with ease, in part with the use of the identified likely object location. Finally, the system renders the augmented reality based digital content along with the live camera feed for display by a display device of the computing device.

In this way, the location determination system described herein overcomes the limitations of conventional tools and techniques that assist in user navigation, namely the inability of these tools to assist users in navigating from one location to another within venues. In contrast with conventional tools and techniques, the system described herein generates an augmented reality based digital content that indicates the location of an object within the digital image, which then serves as part of an internal venue guide for the user. In one example, the object identified in the digital image is an indicator of the user's location within the venue at a particular point in time. This location is used in conjunction with other information associated with the user, e.g. user ticketing information, to guide the user in navigating to another part of the venue, e.g. the user's seat. As a result, the location determination system described herein overcomes the limitations of conventional tools and techniques of aiding user navigation.

This Summary introduces a selection of concepts in simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
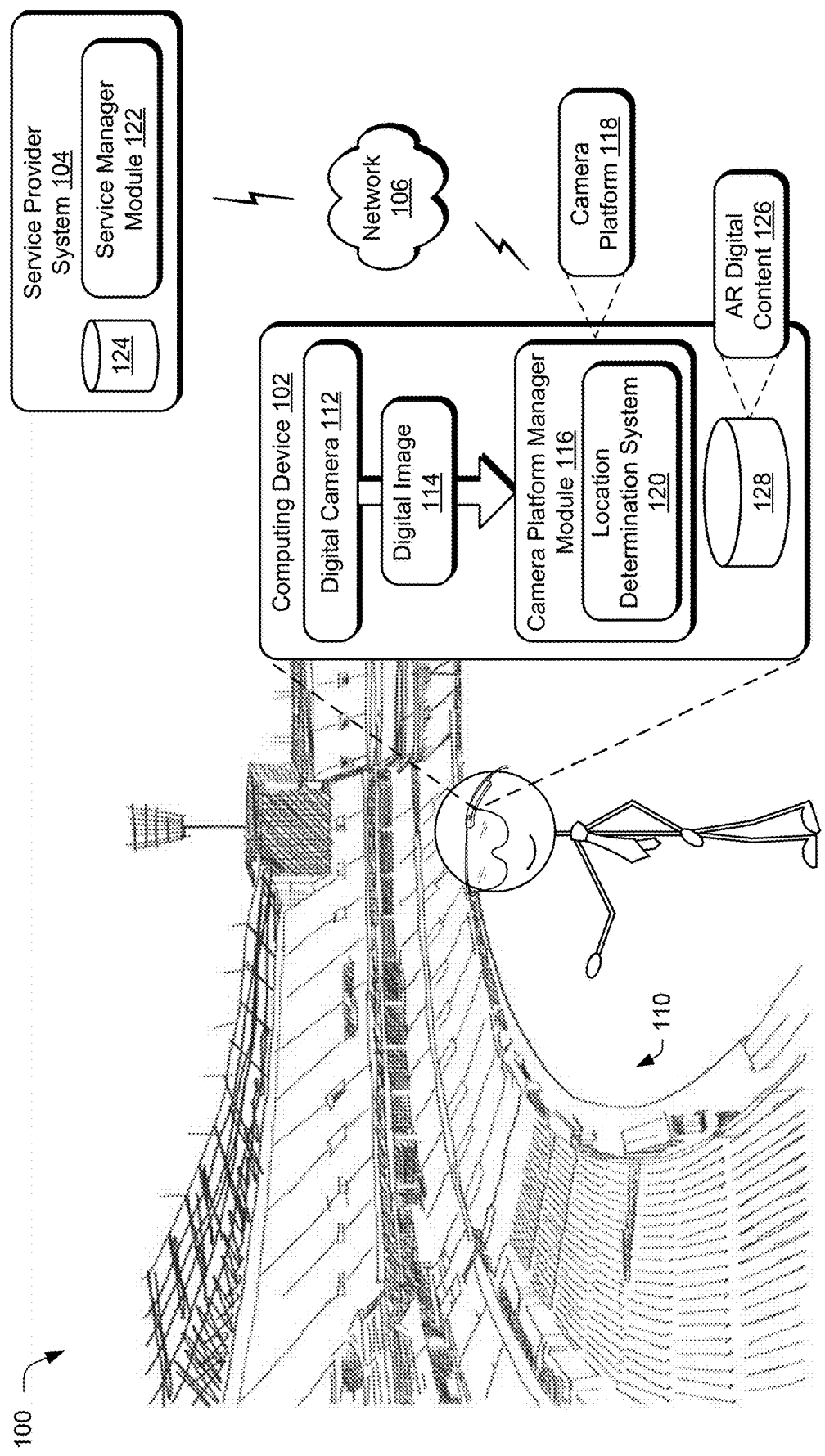
FIG. 1 is an illustration of a location determination system operable to assist user navigation within a venue using augmented reality (AR) digital content that is generated by determining a location of an object within the digital image.

Conventional tools and techniques that assist user navigation within and around physical environments encounter a variety of challenges. Individuals that purchase tickets to live events held at large venues need assistance in identifying the venue's location and navigating the areas within and around the venue. Specifically, individuals may desire assistance in identifying a fast route to their seats, in addition to finding restrooms, merchandise shops, or concession stands near these seats. Such navigational assistance improves the individuals' ability to enjoy attending live events. Conventional tools and techniques to do so, however, are ineffective in providing such assistance because these tools may not be able to receive a signal or lack the requisite signal strength within the venue to implement various location determination functionalities. Moreover, conventional location determination functionalities may be implemented using a variety of devices, making these tools and techniques cumbersome and inefficient.

Accordingly, a location determination system described herein addresses these challenges and efficiently assists user navigation within venues with the use of contextual information. Contextual information includes locations of restrooms, signs, banners, concession stands, merchandise shops, and other venue facilities. In one example of the location determination system, the system initially receives at least one digital image as part of a live camera feed. The camera feed may include digital content in the form of digital video or a collection of digital images within a physical environment—inside the venue for instance.

The digital images may capture a variety of objects within the venue, e.g. signs, banners, items on the concession stands, and so forth. From this, the system identifies at least one of the objects included in the digital image via, for example, machine learning. After identifying the object, the location determination system determines a location of the object in relation to a digital map of a physical environment. The location of the object within the venue serves as a marker or indicator of the user's location (in relation to the identified object) at a particular point in time, which may then be leveraged in a variety of ways, such as guiding a user to a desired location using a digital map.

The location within the venue may be identified using various techniques. In a first example, text associated with the identified objects is identified using optical character recognition (OCR) techniques. In this example, the text may identify a current location directly, e.g., indicate a section of the physical venue, seat location, and so forth.

In a second example, the text associated with the identified objects is usable to indirectly determine the objects' location by, e.g., describing the object with which the text is associated. A digital image, for instance, may capture a sign of a merchandise store (the object) with a banner containing the words "merchandise store." Text indicating the name of the store may then be used as part of a lookup/search to locate the store with respect to a digital map. In this way, the location of the computing device used to capture the image is determined.

In a third example, objects that do not include text are recognized using object recognition, and subsequently used as part of a search to determine a location. A computing device, for instance, may capture a live feed of digital images that include food items, drinks, bottles, and other items (i.e. objects) stacked on the shelves of a concession stand. Identification of the object may be used to determine the objects' location—on or near a concession stand. By consequence, the user's location is also marked as being in or near the concession stand with respect to a digital map.

A computing device includes the location determination system may then leverage the determined location in a variety of ways. After determining the location of the object in relation to a digital map of a physical environment, for instance, the system generates augmented reality digital content that indicates the determined object location in relation to the digital image. Moreover, in one example, the augmented reality based digital content is configured as a map that guides the user from the location of the identified object to another location, e.g. the user's seat.

After determining the augmented reality digital content, the location determination system described herein renders the augmented reality based digital content along with the live camera feed for display by a display device of the computing device. The rendered augmented reality digital content is accessible to the user via a mobile phone, handheld device, laptop, or other such device in real time. In this way, the location determination system described herein overcomes the limitations of conventional techniques and facilitates effective user navigation within and around the areas of a venue such that the user's ability to attend and enjoy live events at these venues is improved. Further discussion of these and other examples is described in the following discussion.

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

FIG. 1 is an illustration of a digital medium environment 100 in an example implementation operable to employ computer vision and augmented reality techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles as illustrated for computing device 102) and so forth. Thus, a computing device may range from full resource devices with substantial memory and processor resources (e.g., personal computers, game consoles) to a low-resource device with limited memory and/or processing resources (e.g., mobile devices).

Figure 29:
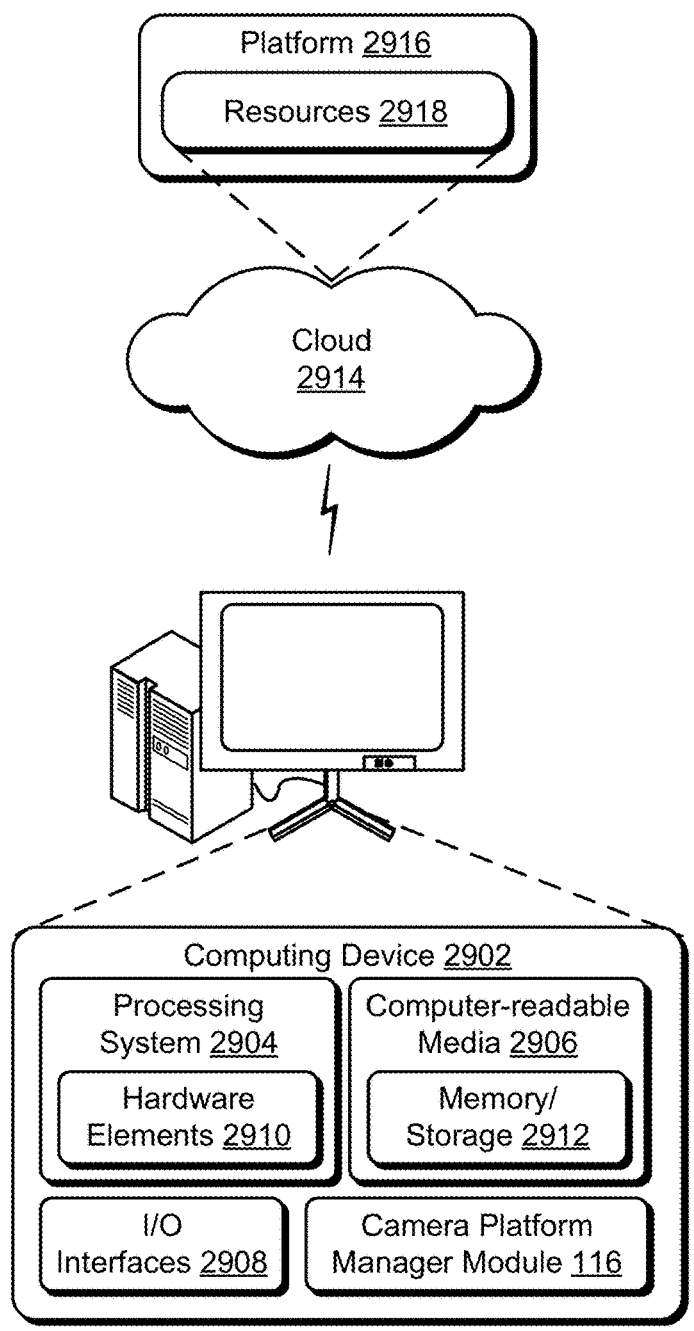
FIG. 29 illustrates an example system including various components of an example device that can be implemented as any type of computing device as described and/or utilized with reference to FIGS. 1-28 in order to implement embodiments of the techniques described herein.

Additionally, although a single computing device is shown, a computing device may be representative of a plurality of different devices, such as multiple servers utilized by a business to perform operations "over the cloud" for the service provider system 104 as described in FIG. 29.

The computing device 102 is illustrated as being worn by a user in a physical environment 108, e.g., a stadium or other large venue as illustrated whether indoor and/or outdoor. The physical environment 108 in this example includes an event area and seating area 110. The computing device 102 includes a digital camera 112 that is configured to capture digital images 114 of the physical environment 108, such as through use of a charge coupled device (CCD) sensor. The captured digital images 114 may then be stored as pixels in a computer-readable storage medium and/or rendered for display by a display device, e.g., LCD, OLED, LED, etc.

The computing device 102 also includes a camera platform manager module 116 that is configured to implement and execute a camera platform 118 (e.g., through use of a processing system and computer-readable storage media) that may serve as a basis for a variety of functionality. The camera platform 118, for instance, may implement a "live view" formed of digital images 114 taken of the physical environment 108 of the computing device 102. These digital images 114 may then serve as a basis to support other functionality.

An example of this functionality is illustrated as location determination system 120. This may be implemented by the location determination system 120 through use of the camera platform 118 in a variety of ways. In a first such example, the location determination system 120 is configured to collect digital images 114. This may include digital images 114 of physical objects in the physical environment 108 in this example, a picture taken of a television screen or other display device, and so on. The digital image 114 may also be captured of a user interface output by the computing device 102, e.g., as a screenshot from a frame buffer.

The location determination system 120 includes object recognition functionality to recognize objects included within the digital image 114, e.g., via optical character recognition or machine learning. From this, the location determination system 120 may collect data pertaining to the recognized objects. Data describing the recognized objects, for instance, may be communicated via the network 106 to the service provider system 104. The service provider system 104 includes a service manager module 122 that is configured to obtain data related to the objects (e.g., through use of a search) from a storage device 124. This data may then be communicated back to the computing device 102 via the network 106 for use by the location determination system 120. In another example, this functionality is implemented locally by the computing device 102.

The location determination system 120, for instance, may generate augmented reality digital content 126 (illustrated as stored in a storage device 128) for output in the user interface of the computing device 102 as part of a "live feed" of digital images 114 taken of the physical environment 106. The AR digital content 126, for instance, may describe a location of a seat, directions to the seat, a relation of that seat to other seats, directions to desired services available at the physical environment 106, and so forth. This AR digital content 126 is then displayed proximal to the object by the object inventory manager module 120. In this way, the camera platform supports functionality for the user 104 to "look around" the physical environment 106 and ascertain additional information about objects included within the physical environment.

In another example, the location determination system 120 leverages the camera platform 118 to make recommendations for a user. The digital image 114, for instance, may also be processed using machine learning. In this example, the digital images are used to generate information describing characteristics of the physical environment 108. These characteristics are then used as a basis to form recommendations (e.g., through machine learning). Other examples are also contemplated, as further described in the following section.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Location Determination System

Figure 2:
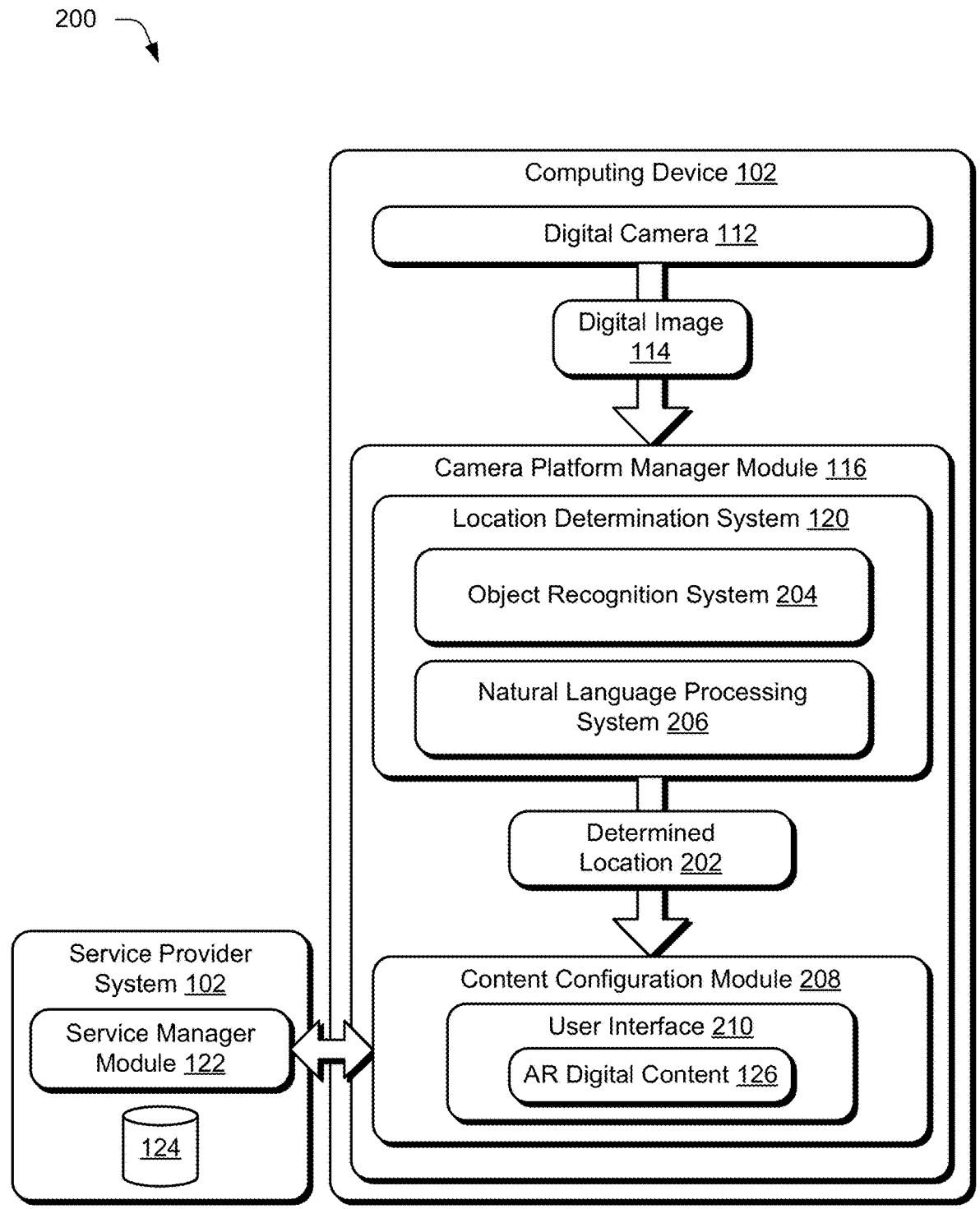
FIG. 2 depicts, in greater detail, a system in an example implementation of the location determination system along with a content configuration module as part of the camera platform manager module of FIG. 1.
Figure 3:
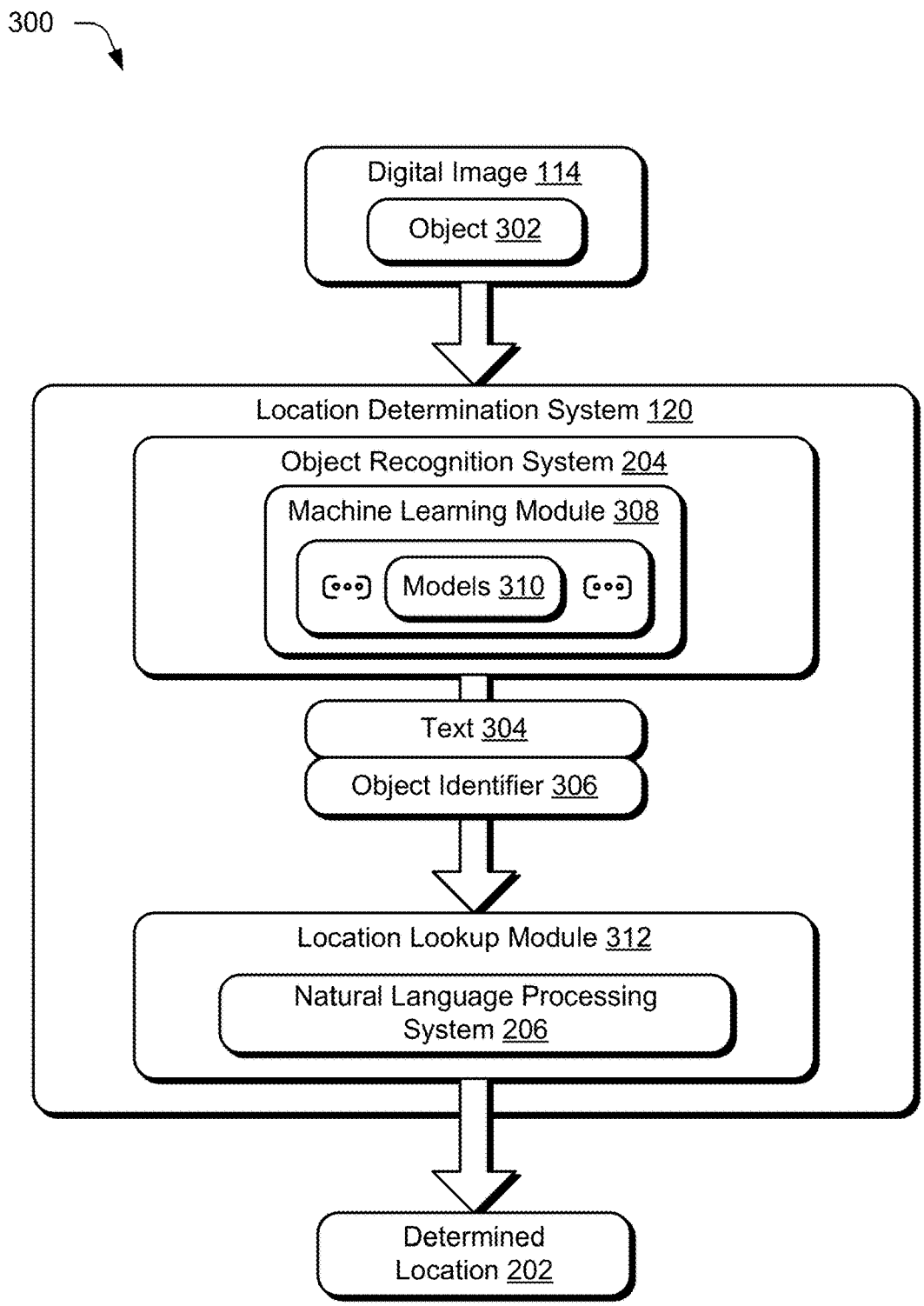
FIG. 3 depicts a system in an example implementation showing operation of the location determination system as employing object recognition of an object identified in a digital image to determine a location.
Figure 4:
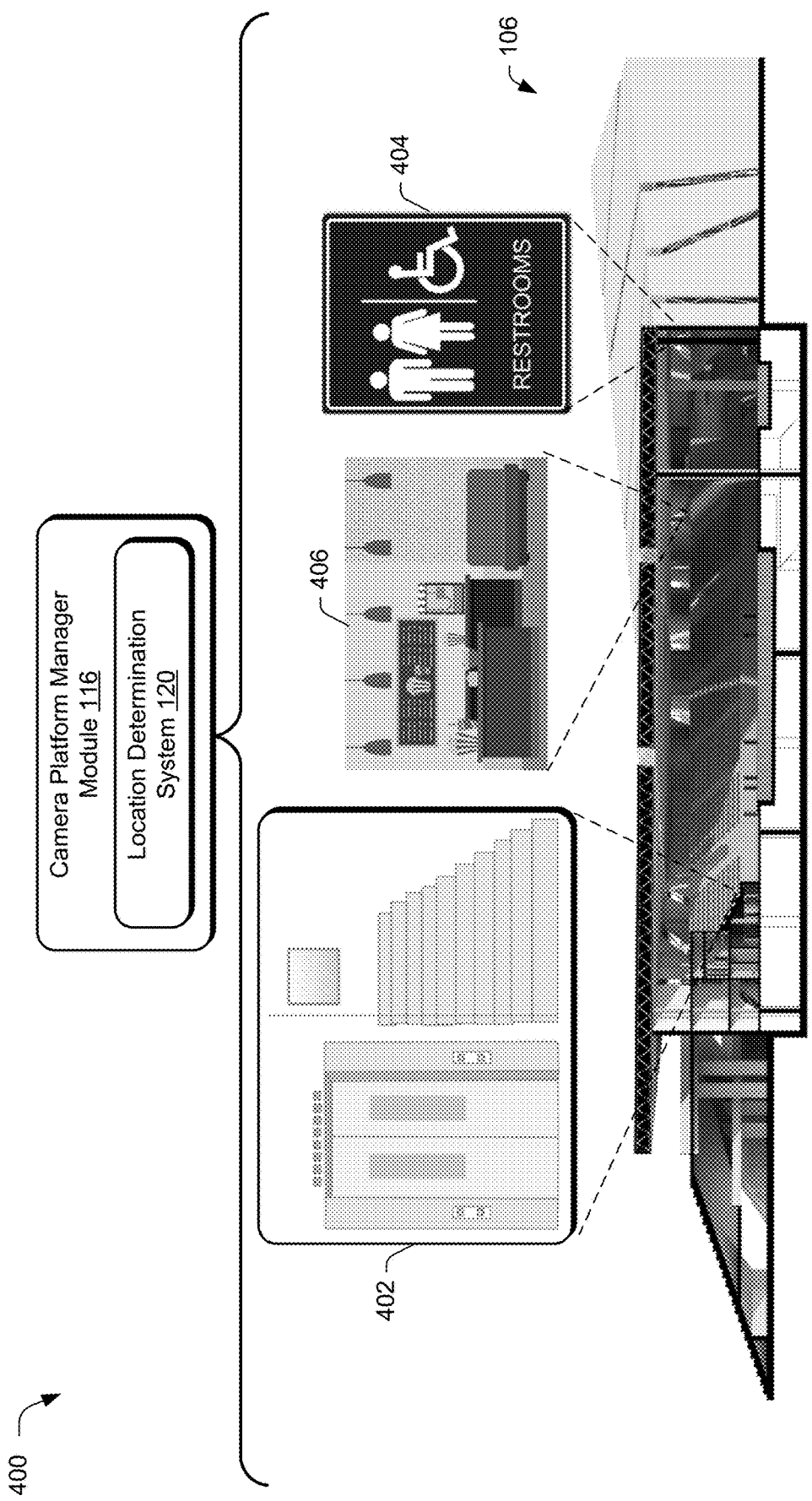
FIG. 4 depicts an example of a physical environment as a stadium.
Figure 5:
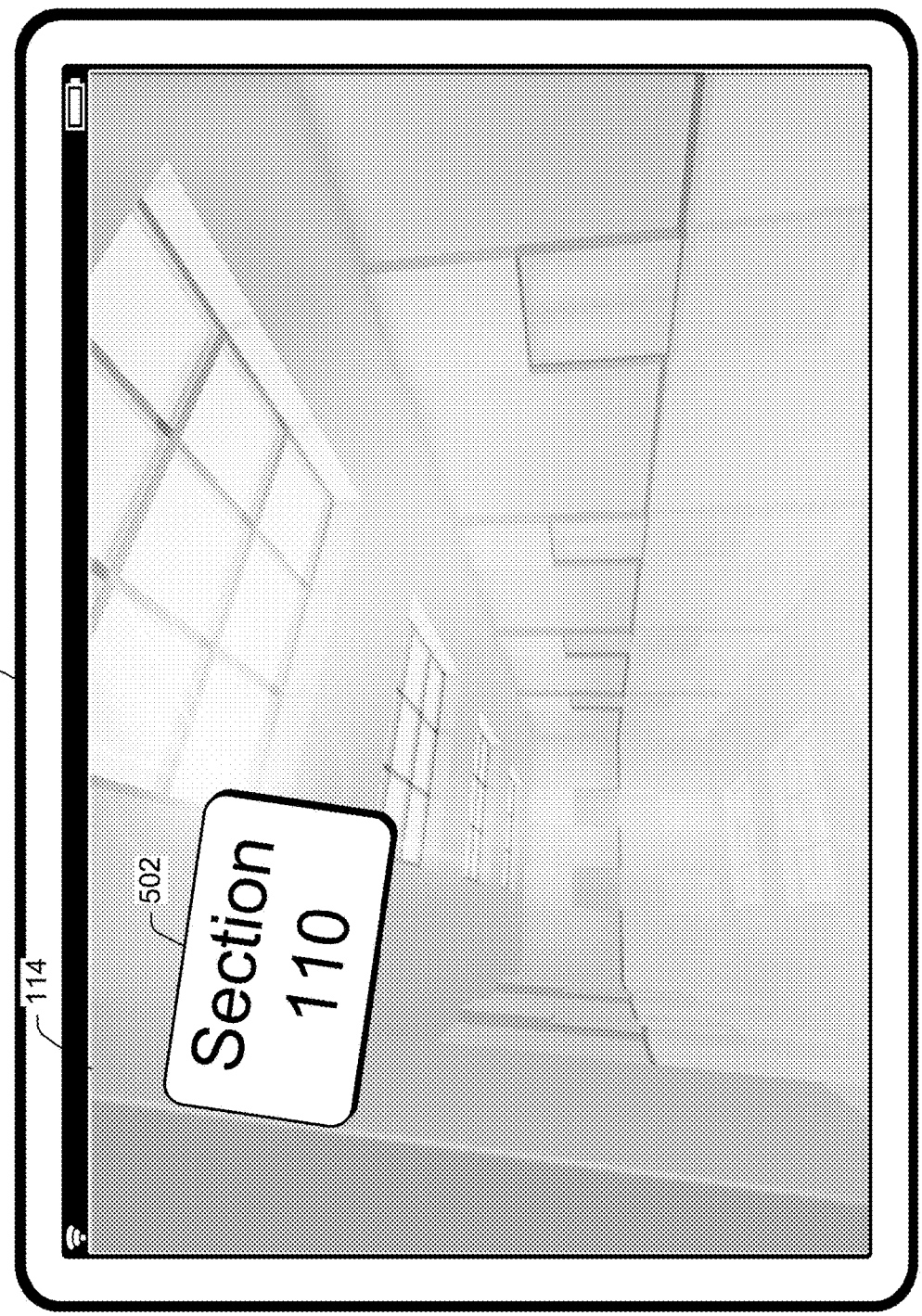
FIG. 5 depicts an example of text included in a digital image that is directly indicative of a location.
Figure 6:
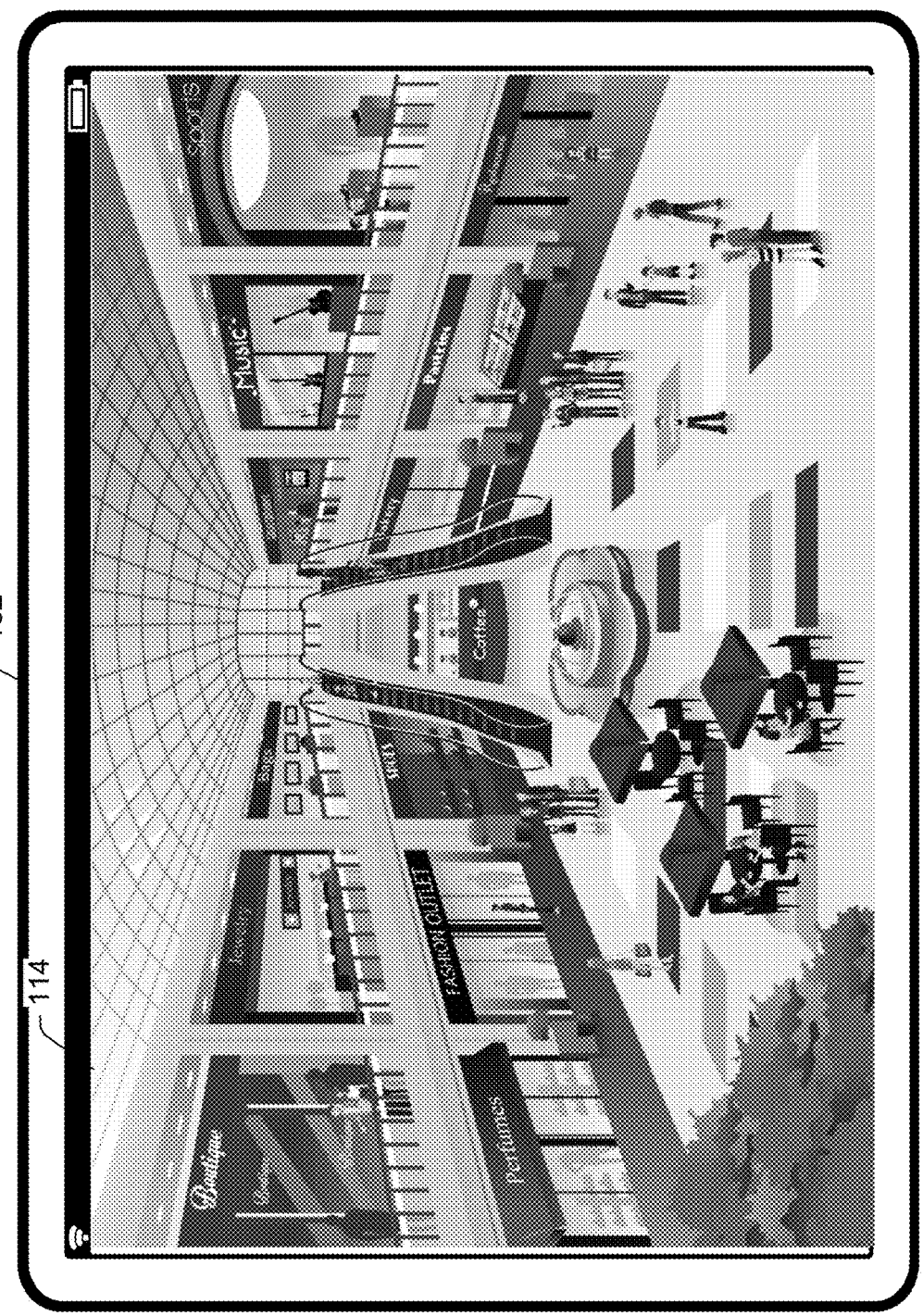
FIG. 6 depicts an example of text included in a digital image that is indirectly indicative of a location through identification of the object.
Figure 7:
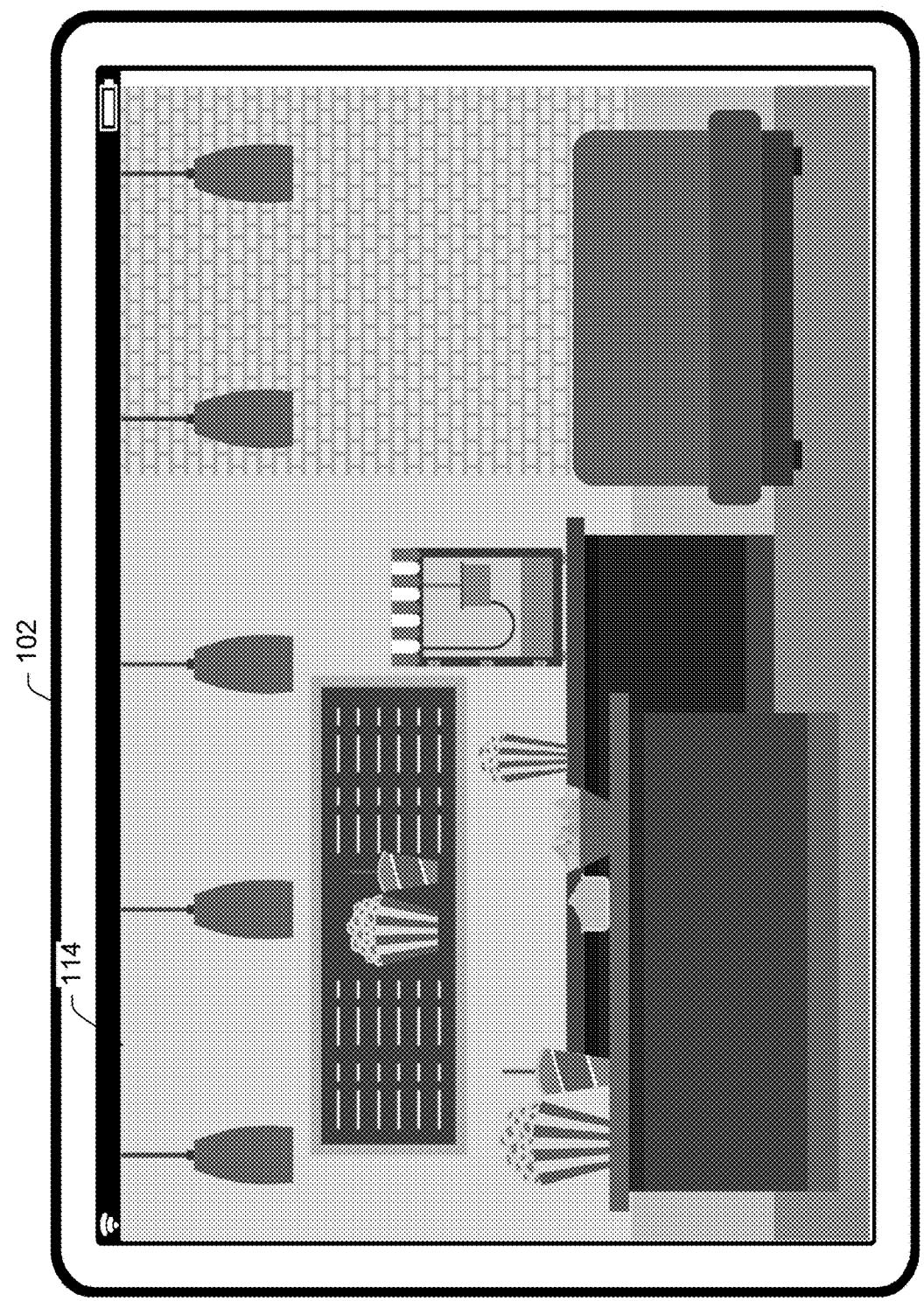
FIG. 7 depicts an example of objects included in a digital image and object recognition that does not include text that is indicative of a location.
Figure 8:
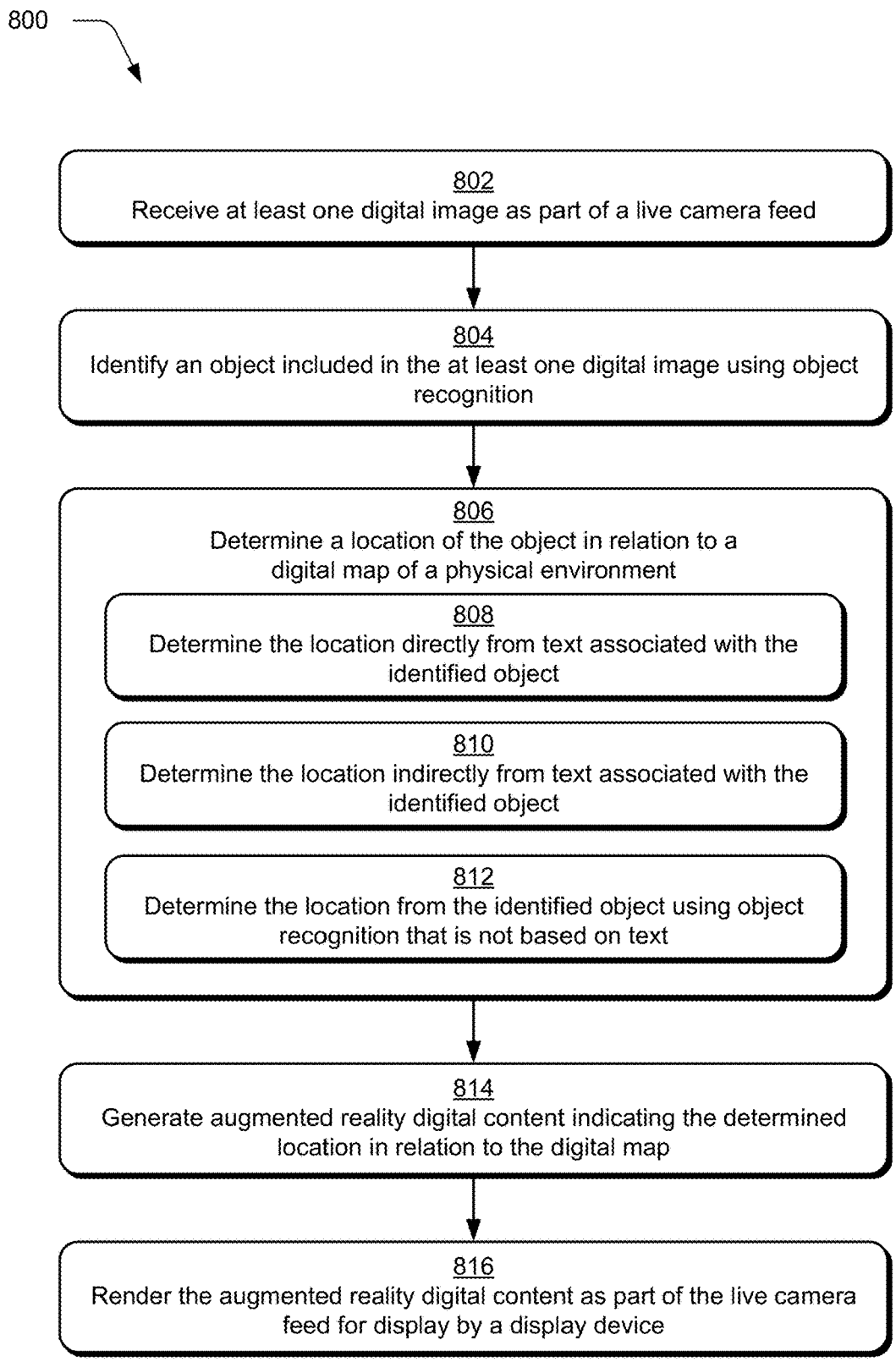
FIG. 8 is a flow diagram depicting a procedure in an example implementation in which digital images are processed to determine a location by the location determination system of FIG. 2.

FIG. 2 depicts a system 200 in an example implementation showing operation of the location determination system 120 along with a content configuration module as part of the camera platform manager module 116 of FIG. 1 in greater detail. FIG. 3 depicts a system 300 in an example implementation showing operation of the location determination system 120 as employing object recognition of an object identified in a digital image 114 to determine a location. FIG. 4 depicts an example 400 of a physical environment 108 as a stadium. FIG. 5 depicts an example 500 of text included in a digital image that is directly indicative of a location. FIG. 6 depicts an example 600 of text included in a digital image that is indirectly indicative of a location, e.g., through identification of the object itself. FIG. 7 depicts an example 700 of objects included in a digital image and object recognition that does not include text that, by itself, is indicative of a location. FIG. 8 depicts a procedure 800 in an example implementation in which digital images are processed to determine a location of the computing device 102 by the location determination system 120 of FIG. 2.

The following discussion describes techniques that may be implemented utilizing the previously described systems and devices. Aspects of the procedure as shown stepwise may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-8.

In this example, computer vision techniques are utilized to determine a location of a computing device 102 with respect to a physical environment 106, e.g., a sports venue. As shown in an example 400 of FIG. 4, for instance, the physical environment 106 may include numerous complex levels that prove difficult for a user to navigate. Specifically, locating desired services, such as where an elevator 402 is located may be challenging. Such information is useful because it enables users to locate restrooms 404, concessions 406, merchandise, and other services. An additional challenge may be the composition of the physical environment 106 itself, which, due to the massive amounts of concrete and steel, inhibits receipt of signals that are used by conventional positional determination functionalities to ascertain a height of a particular level. Resolving ambiguities associated with this height or addressing the challenges of calculating this height is also referred to as a "z axis" problem. In the techniques described herein, however, the location determination system 120 leverages digital images captured of the physical environment to determine a location, which may then be used as a standalone functionality or to supplement and/or verify a location determined by other location determination functionalities of the computing device 102, e.g., cell tower triangulation, GPS, and so forth.

To begin, at least one digital image 114 is received from a digital camera 112 by the camera platform manager module 116 as part of a live camera feed (block 802). The digital image 114, for instance may capture a physical environment 108, in which, the computing device 102 is disposed. From this digital image 114, a location determination system 120 of the camera platform manager module 116 determines a location 202. This may be performed locally by the computing device 102 and thus is operable in situations in which conventional location determination functional may fail.

Examples of functionality of the location determination system 120 to determine the location are represented by an object recognition system 204 and a natural language processing system 206. The object recognition system 204 is configured to recognize an object 302 in the digital image 114, such as text 304 or to identify a type of object as an object identifier 306, e.g., a "lamp," "paper cup," "food," "shirts," and so forth. The object recognition system 204, for instance, may be configured to recognize text using optical character recognition (OCR), optical word recognition, intelligent character recognition (ICR), intelligent word recognition (IWR), and so forth. In this way, text included in the object 302 may be identified and used as a basis to determine a location as further described below.

In another instance, the object recognition system 204 employs a machine learning module 308 to implement machine learning techniques to identify the object 302 that is not based, at least solely, on text through use of one or more models 310.

The machine learning module 308, for instance, may be configured to employ the models 310 as a classifier usable to recognize the object using machine learning, e.g., neural networks, convolutional neural networks, deep learning networks, structured vector machines, decision trees, and so forth. The models 310, for instance, may be trained using training digital images that are tagged with corresponding identifications of the objects and/or characteristics of the objects.

In an implementation, these training digital images and tags are obtained from a commerce service provider system. The training digital images are tagged by sellers using the system. As a result, contrary to conventional techniques, a multitude of accurately tagged training digital images may be obtained with minimal computation and user cost. Although illustrated as implemented locally by the computing device 102, this functionality may also be implemented in whole or in part by a service provider system 104 via the network 106. Thus, the object recognition system 204 may be used to detect an object 302 included in the digital image 114 and/or characteristics of the object 302 included in the image (block 804).

A location of the object 302 in relation to a digital map of a physical environment is then determined (block 806) by the location determination system 120. This determination may be performed in a variety of ways. In a first example, the location is determined directly from text associated with the identified object (block 808). As shown in an example 500 of FIG. 5, for instance, a digital image 114 is displayed as part of a live feed captured of a physical environment 108, in which, the computing device 102 is disposed. The digital image 114 includes an object 502 having text. The text in this example is indicative, directly, of a location with respect to the physical environment 108, e.g., "Section 110." This text, identified from the object 502, may then be used to determine the location 202 with respect to a digital map of the physical environment 108, e.g., as a search.

In a second example, the location is determined by the location determination system 120 indirectly from text associated with the identified object (block 810). As shown in the example 600 of FIG. 6, a digital image 114 is captured of a physical environment, which in this instance is an indoor mall. Objects including text in this example are signs associated with respective stores. Thus, the text 304 identifies an object 302 at the location but does not directly identify a location of the object 302.

Accordingly, this text 304 may be passed to a location lookup module 312 to determine a location of the object 302, and from this, determination a location of computing device 102 in relation to the object 302. The location lookup module 312, for instance, may use the text 304 as a search of object names (e.g., which may be indexed using the object names) associated with the digital map to determine where the computing device 102 is located with respect to the objects on the map. Additional image processing and mapping techniques may also be employed to increase accuracy of this determination, e.g., triangulation from multiple identified objects such as the stores in the illustrated example.

The location lookup module 312 may also employ natural language understanding as implemented by a natural language processing system 206 to determine the location 202 from the text 304. Natural-language processing as implemented by the natural-language processing module 130 is configured to understand the text 304 received from the object recognition system 204. The natural language processing system 206, for instance, may employ a neural network to generate a representation of a communication from the computing device 102, and from this, understand "what is being expressed" by the text 304. This is then used to determine the location 202 based on what is being expressed.

Natural language understanding as implemented by the natural language processing system 206 may then be used to understand what is being expressed by this language, and from this, infer a location of the computing device. An advertisement, for instance, may include informal language that does not identify the object, itself, but rather is usable to infer a location expressed by the text. The advertisement, for instance, may include directions to a corresponding store at the physical venue. From these directions, the natural language processing system 206 may determine a current location of the computing device 102 with respect to the physical environment 108.

In this way, the location determination system 120 may leverage text that directly indicates a location (e.g., a section, seat number), indirectly indicates a location through identification of an object (e.g., a name of a store), and even more indirectly through text that does not identify the object nor the location. Non-textual techniques object recognition techniques may also be employed by the location determination system 120 as described in the following example.

In a third example, the location is determined by the location determination system 120 using object recognition that is not based on text (block 812). A machine learning module 308, for instance, may include a plurality of models 310 that are trained as classifiers to determine a probability that a digital image includes a particular object. As shown in an example 700 of FIG. 7, for instance, the digital image 114 includes objects including drinks, a counter, popcorn, and a popcorn popper. The models 310 in this example generates object identifiers 306 based on this recognition. From the object identifiers, the location lookup module 312 determines a location 202. Continuing with the previous example, the object identifiers of the drinks, counter, popcorn, and so on may be used by the location lookup module 312 to infer that the computing device 102 is located proximal to a concession stand, and further that the concession stand sells popcorn. This knowledge may then be leveraged by the location lookup module 312 to locate concessions stands in relation to the digital map, and from this, determine the location 202. As a result, the location determination system 120 may leverage object recognition in a variety of different ways to determine a location.

In an implementation, verification functionality is also supported to increase accuracy and confidence that a determined location 202 "is correct." This may be performed, for instance, by continued monitoring of determined locations such that movement between the locations is plausible, e.g., does not "skip around" between levels, different sides of the physical environment 108, and so forth.

Returning again to FIG. 2, the determined location 202 is output by the location determination system 120 and received as an input by a content configuration module 208. The content configuration module 208 is representative of functionality to configure and render digital content based on the determined location 202. In the illustrated example, augmented reality digital content 1206 is generated based on the determined location 202 in relation to the digital map (block 814) and is then rendered as part of the live camera feed for display in a user interface 210 by a display device (block 816). This may be performed in a variety of ways.

Figure 9:
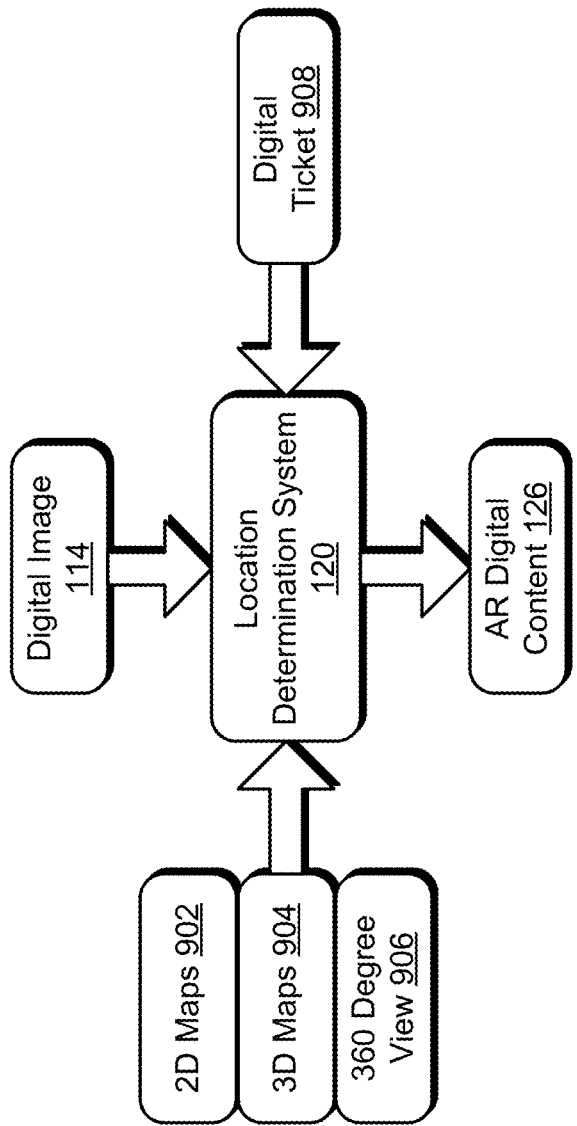
FIG. 9 depicts an example implementation of the location determination system of FIG. 2 that receives a digital image, a digital ticket, and 2D and 3D maps, and generates AR digital content based on the received information.
Figure 10:
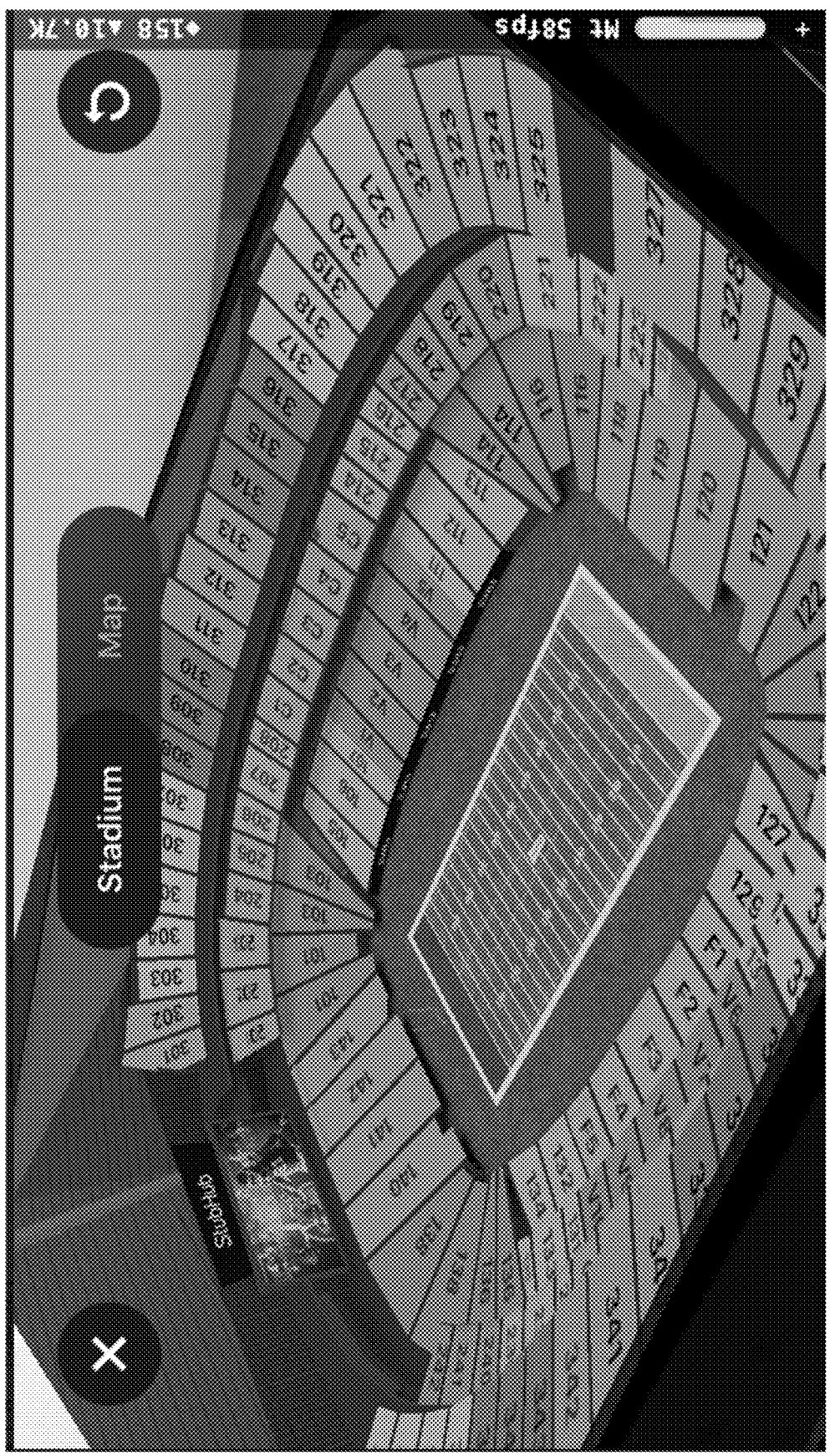
FIGS. 10-28 depict examples of AR digital content rendered as part of a live feed of digital images based on the determined location of the location determination system.
Figure 11:
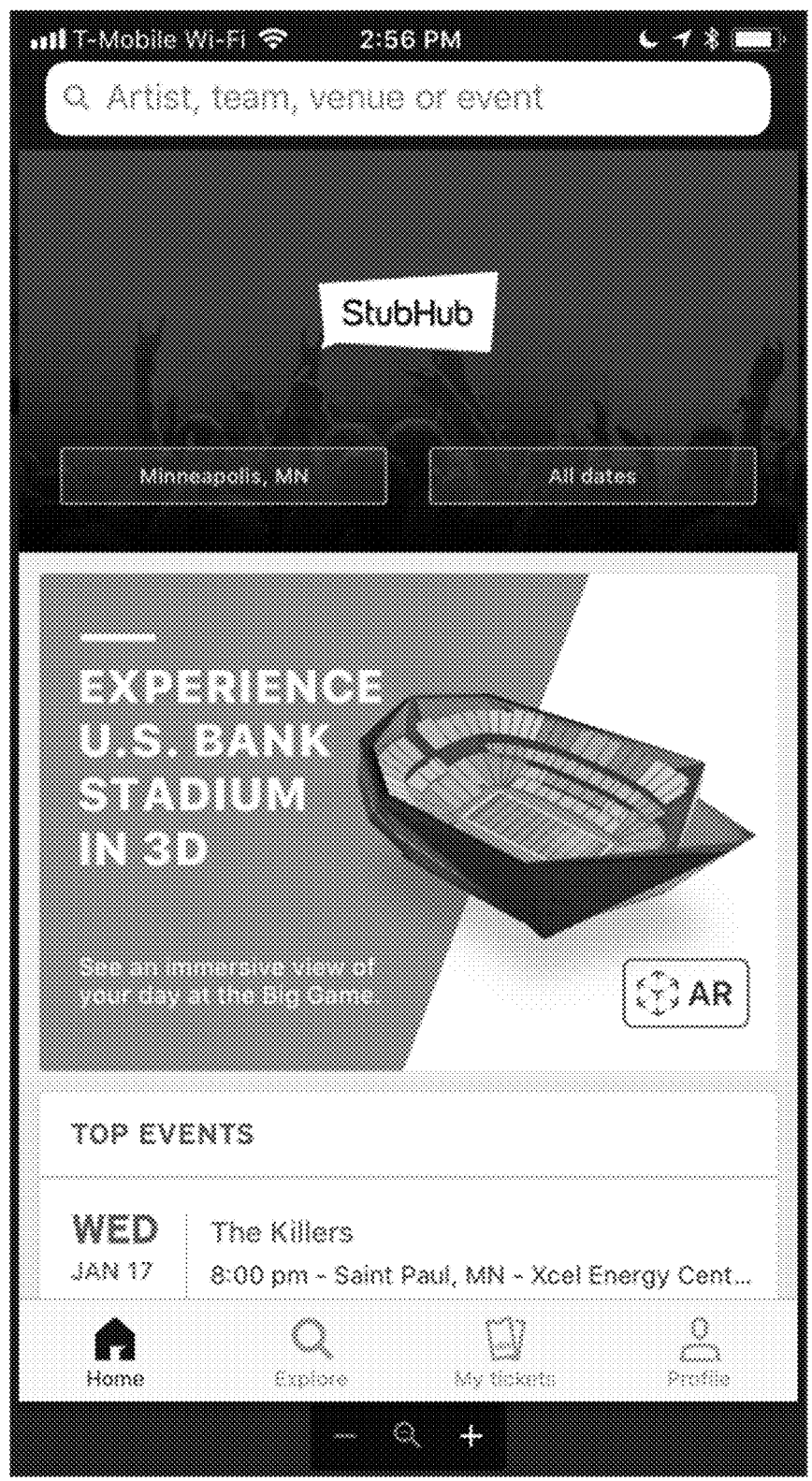
Figure 12:
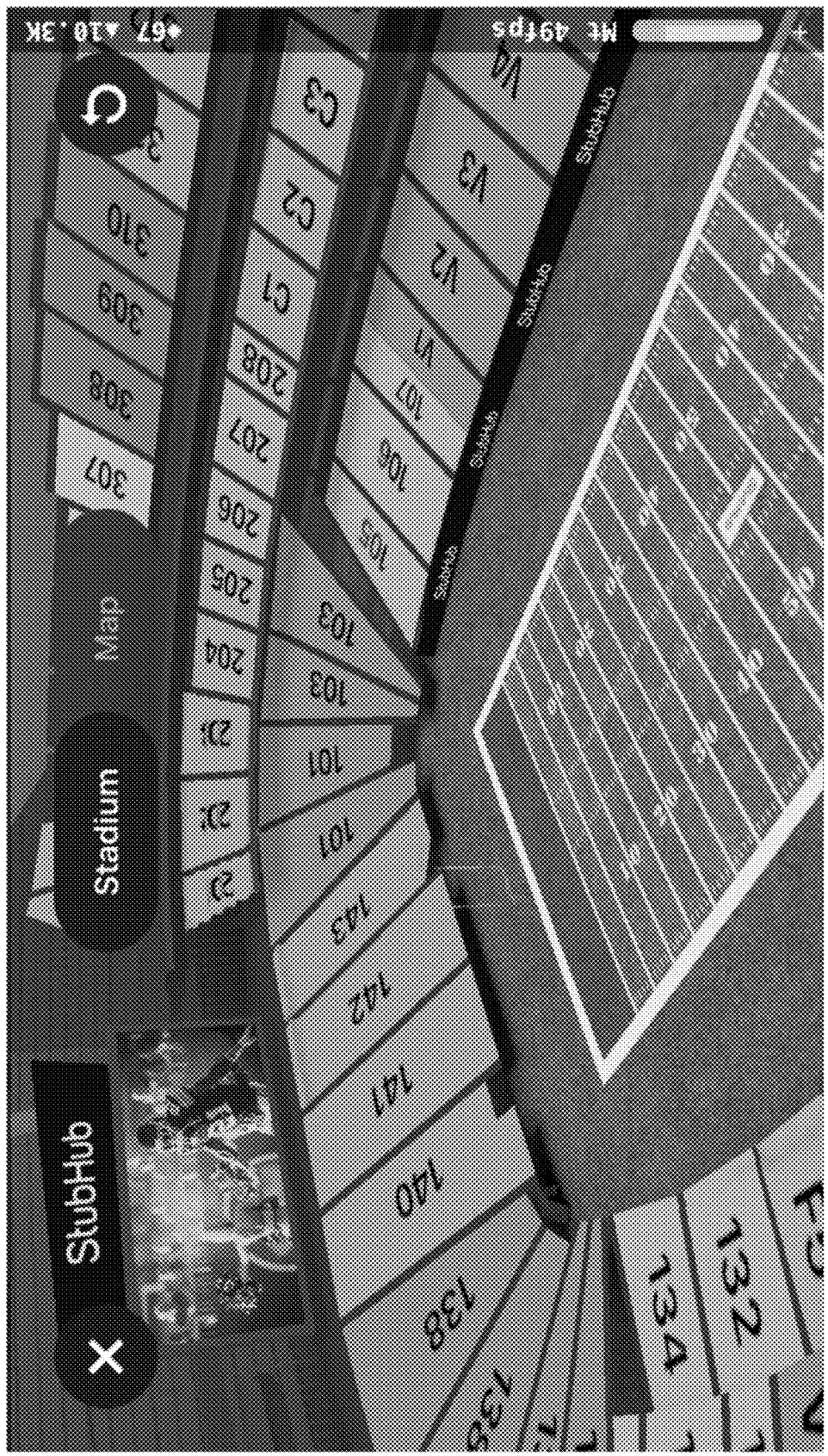
Figure 13:
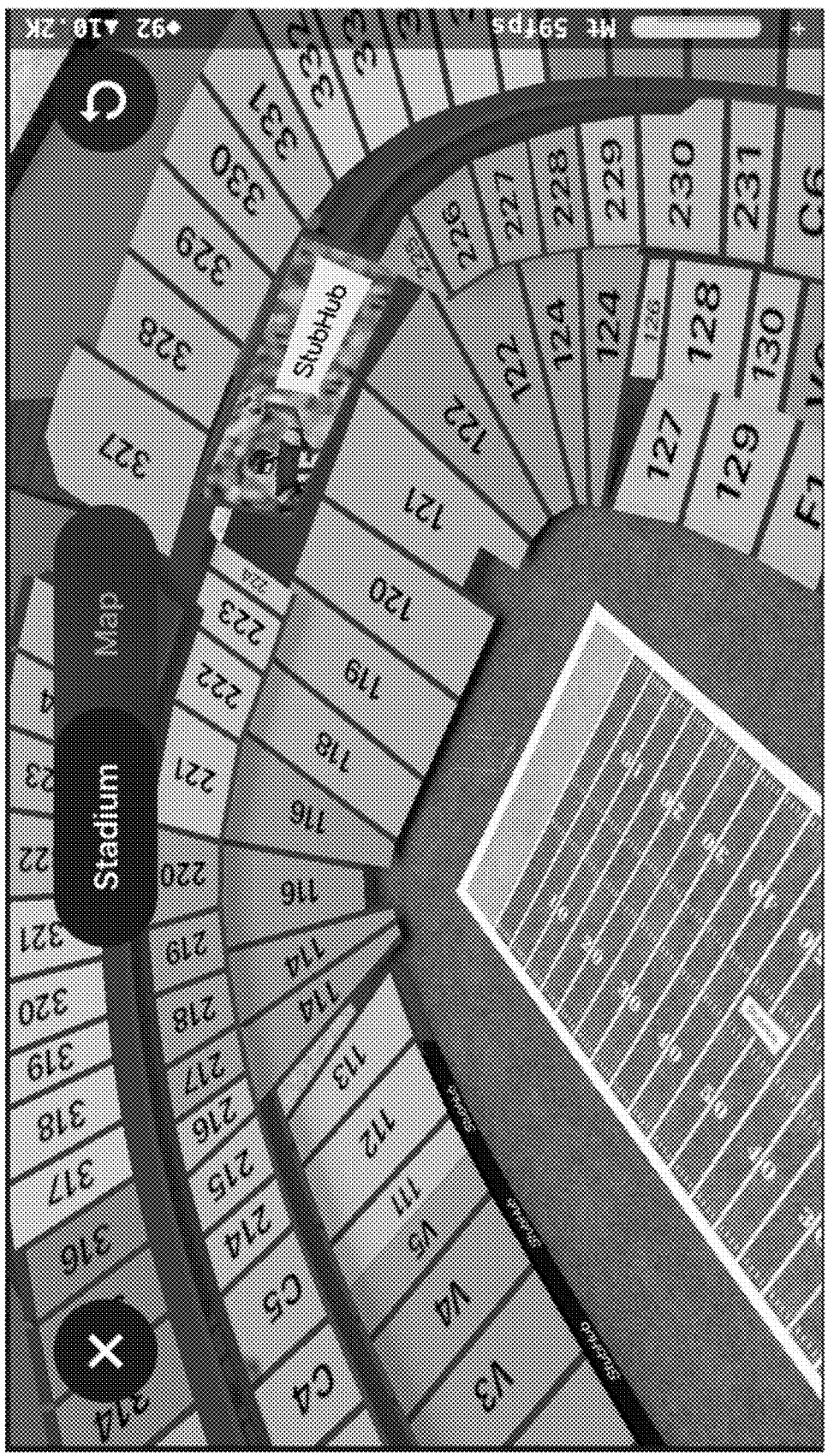
Figure 14:
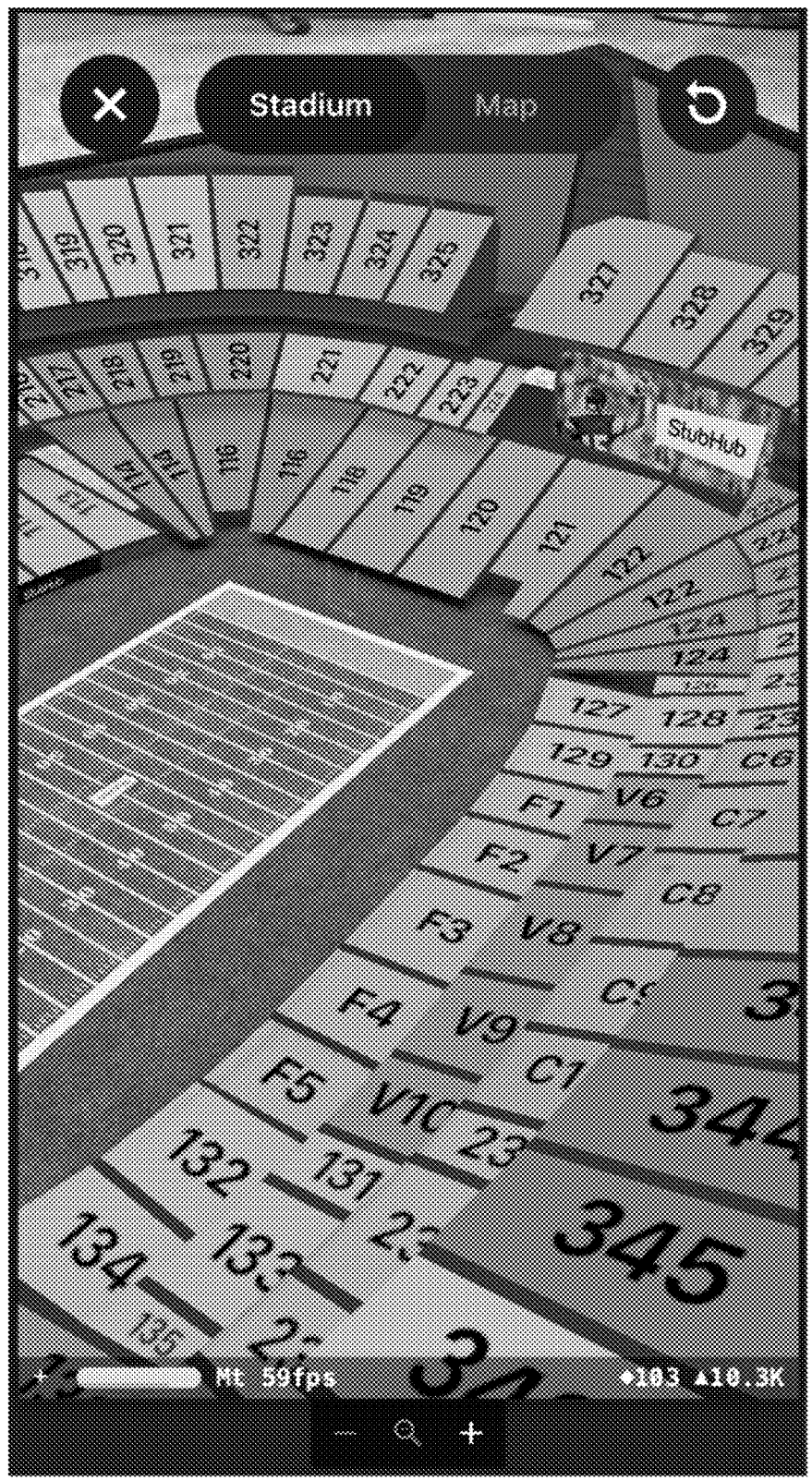
Figure 15:
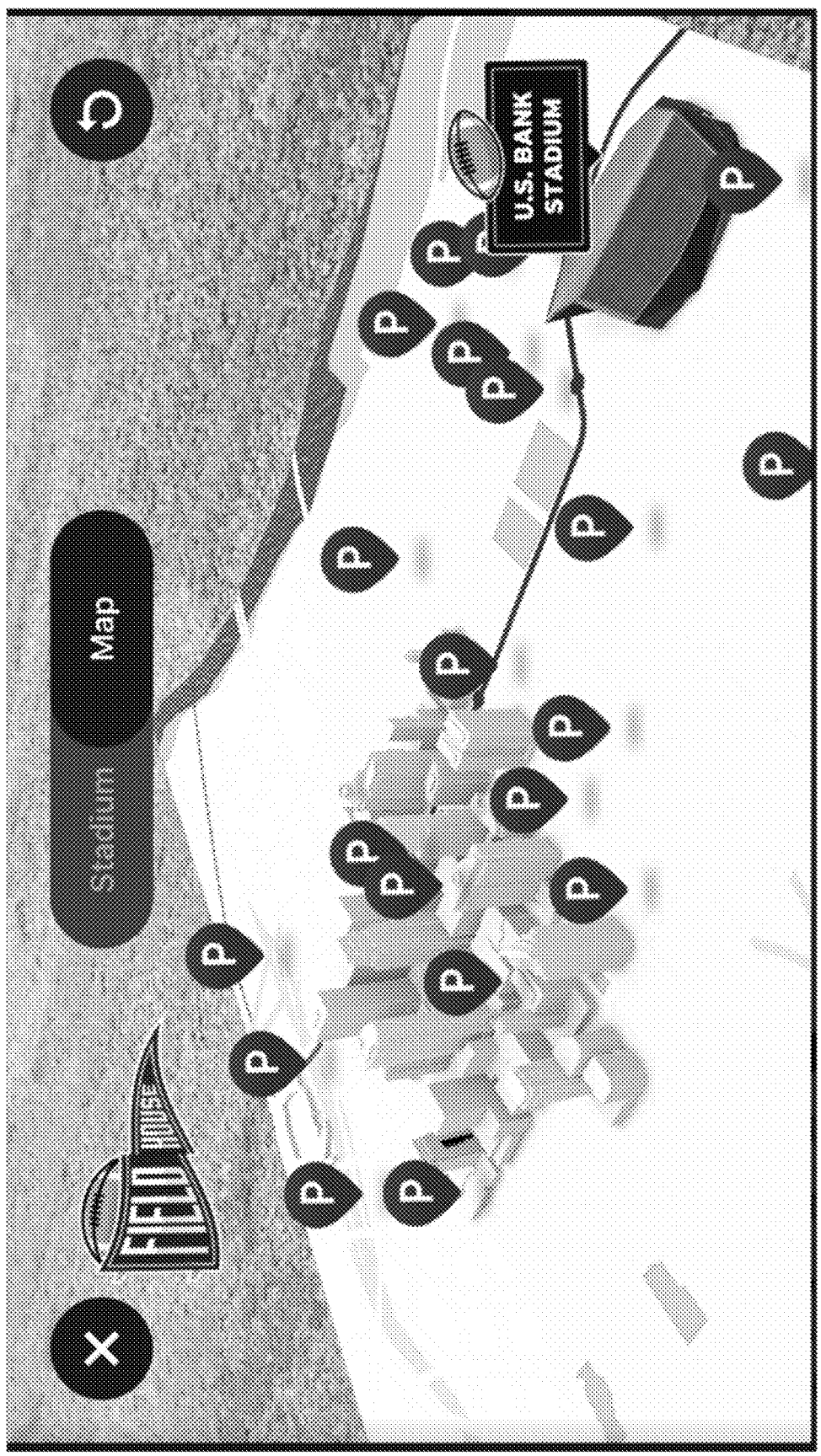
Figure 16:
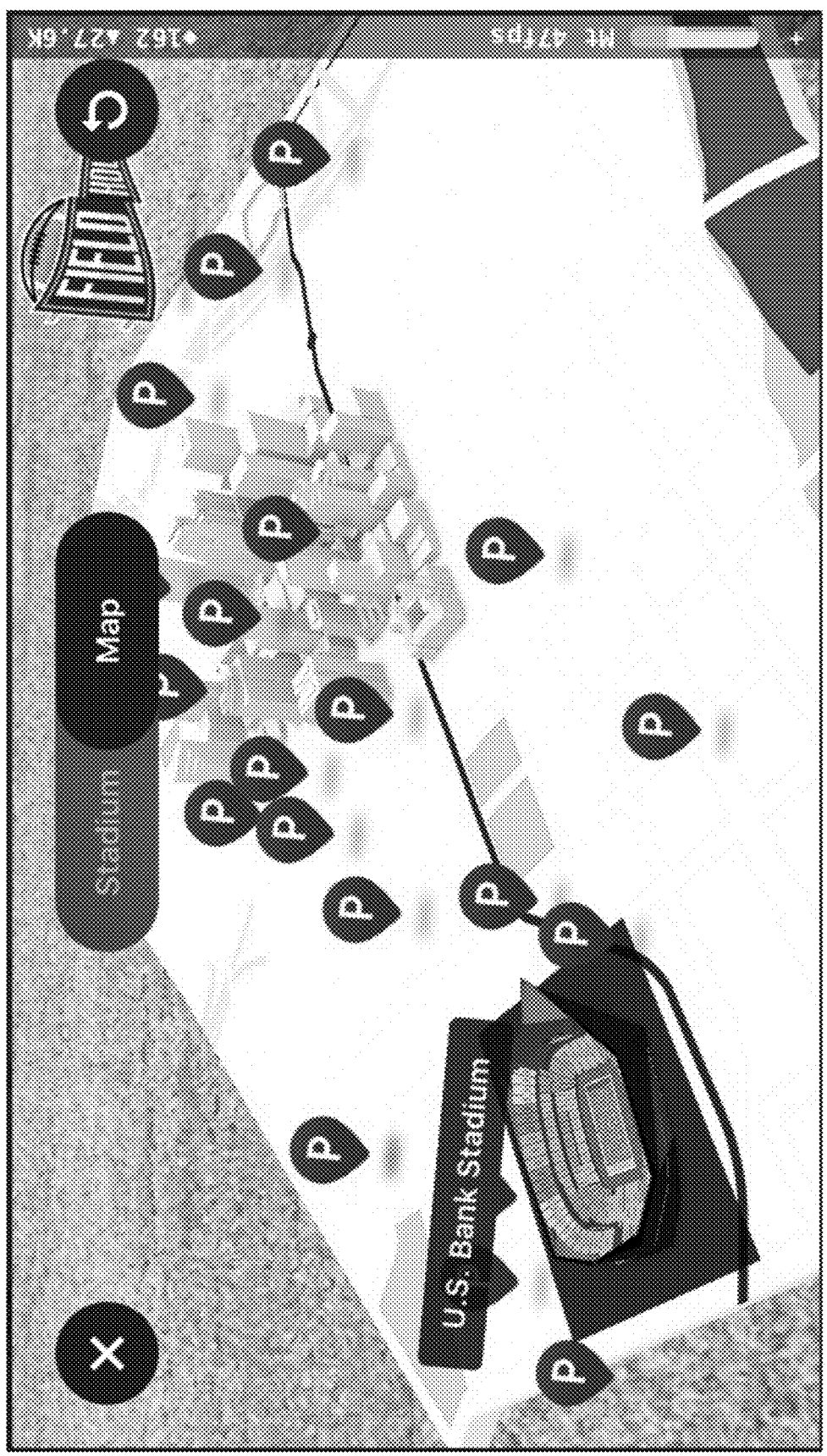
Figure 17:
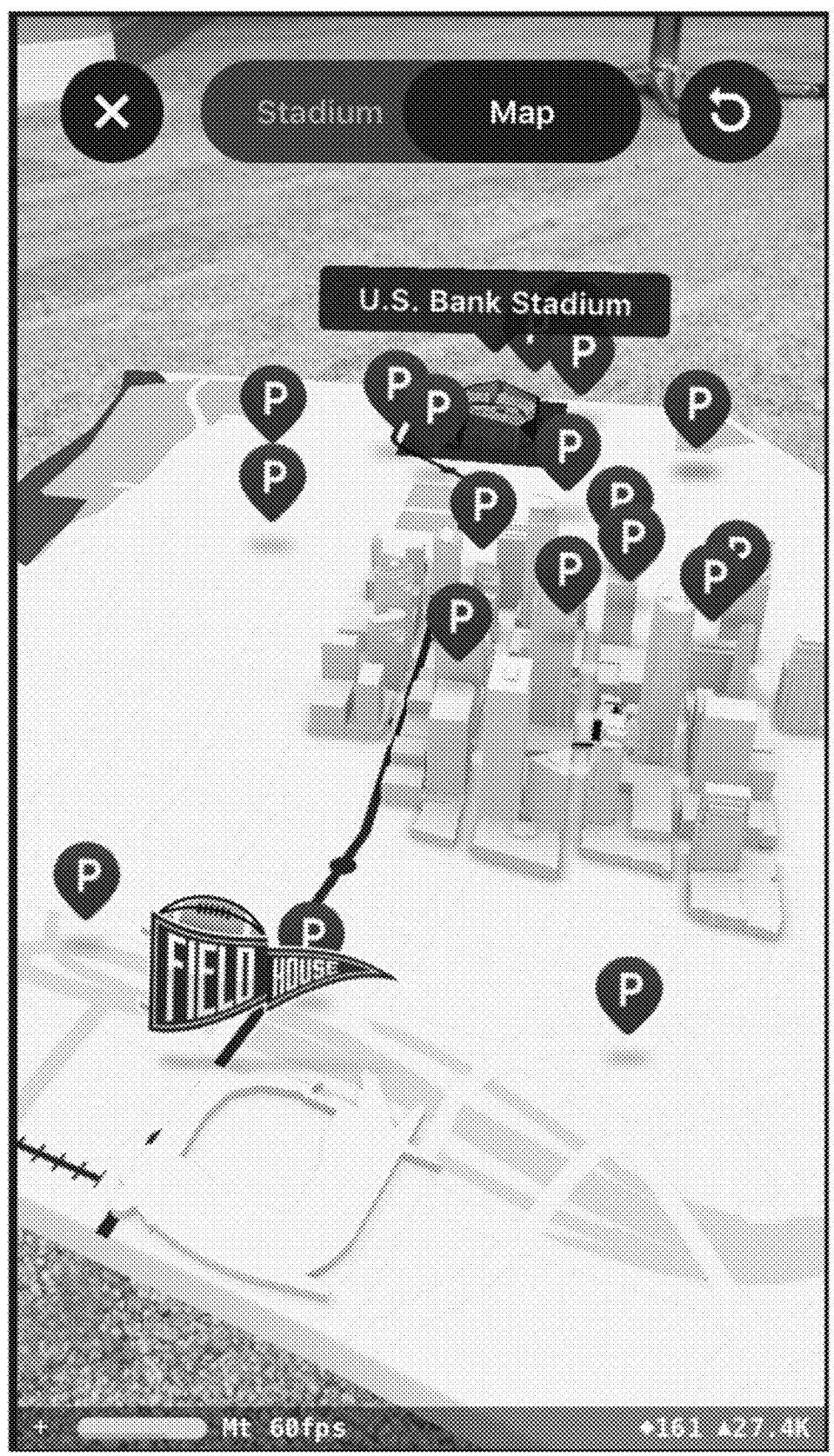
Figure 18:
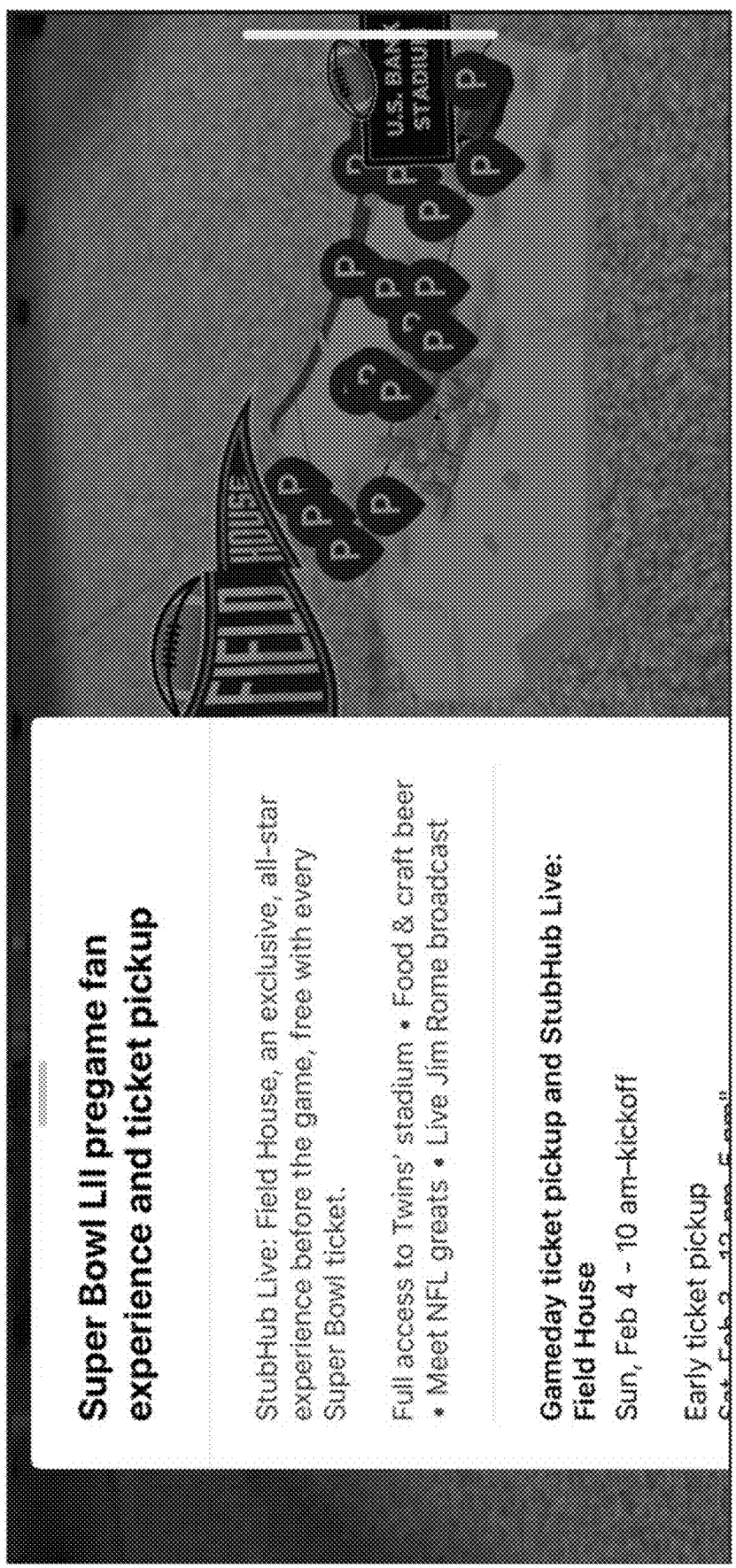
Figure 19:
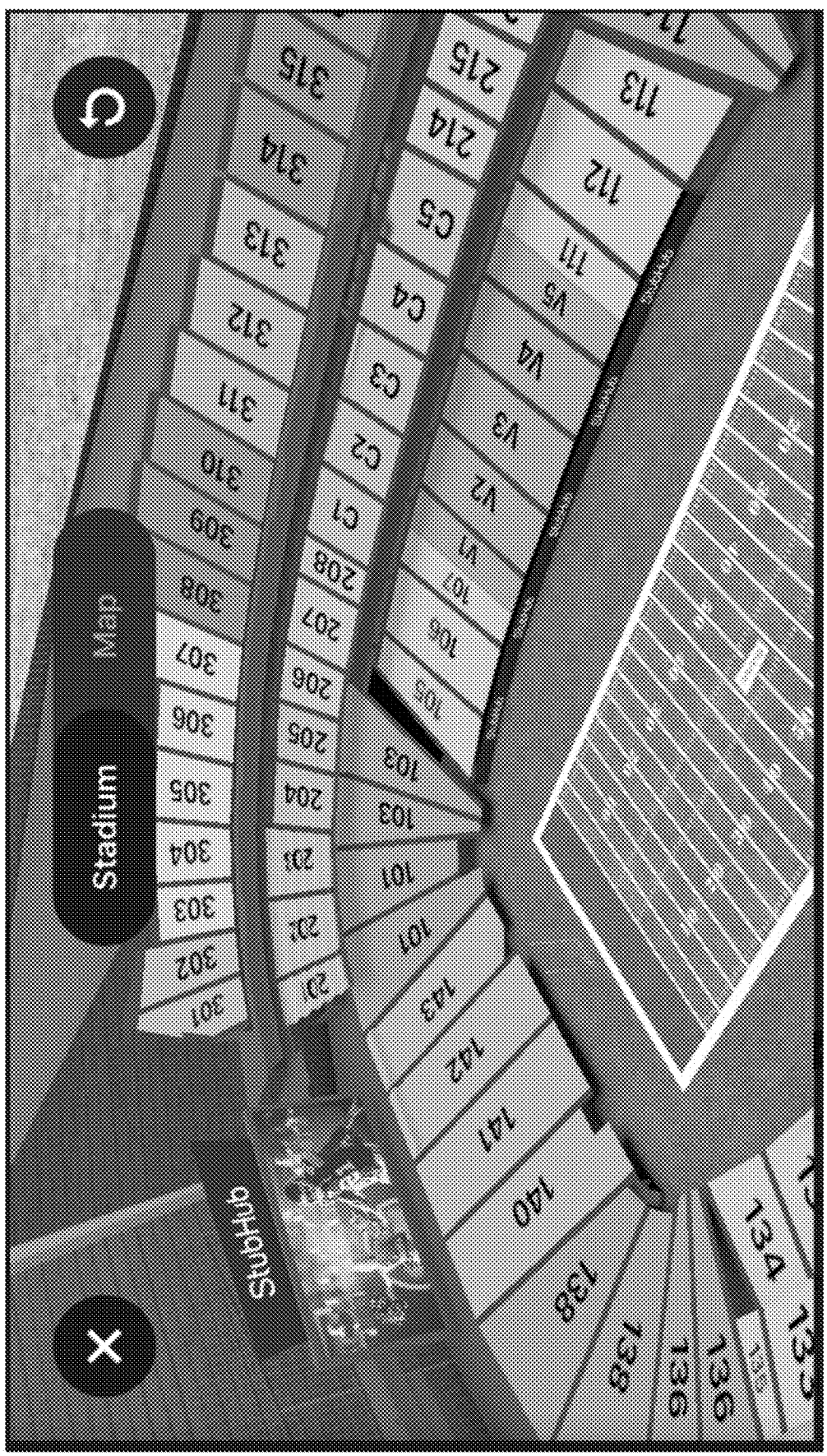
Figure 20:
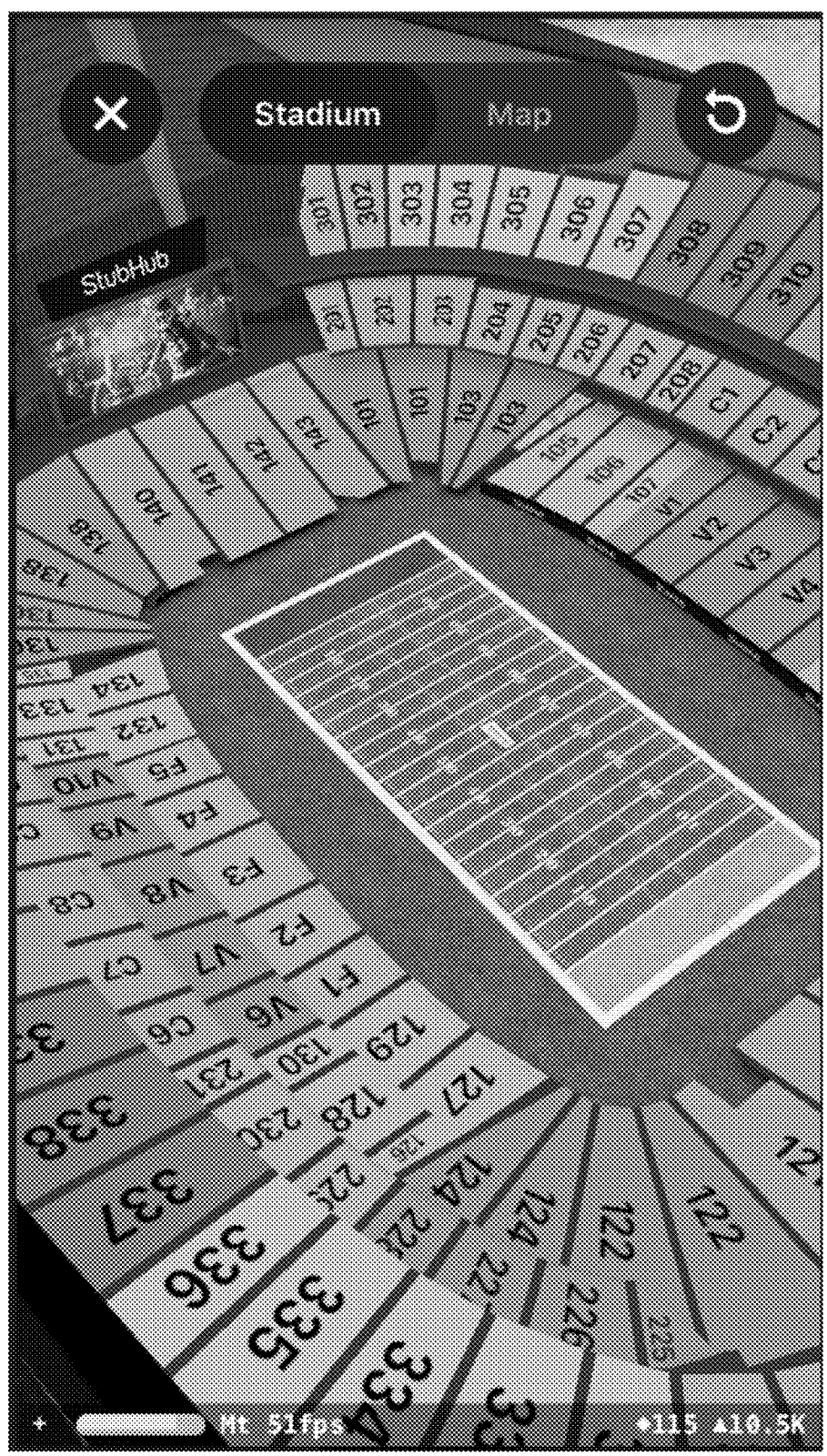
Figure 21:
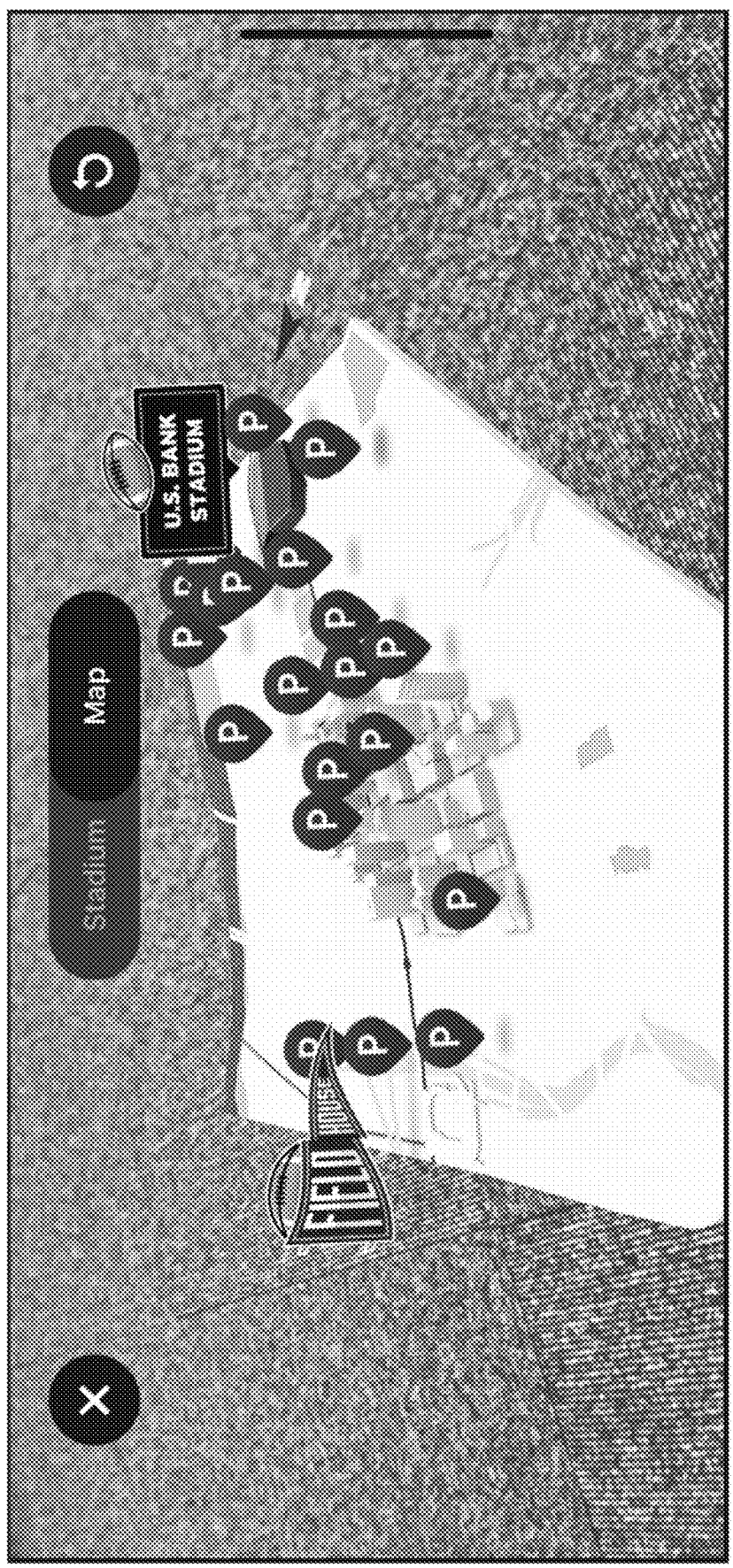
Figure 22:
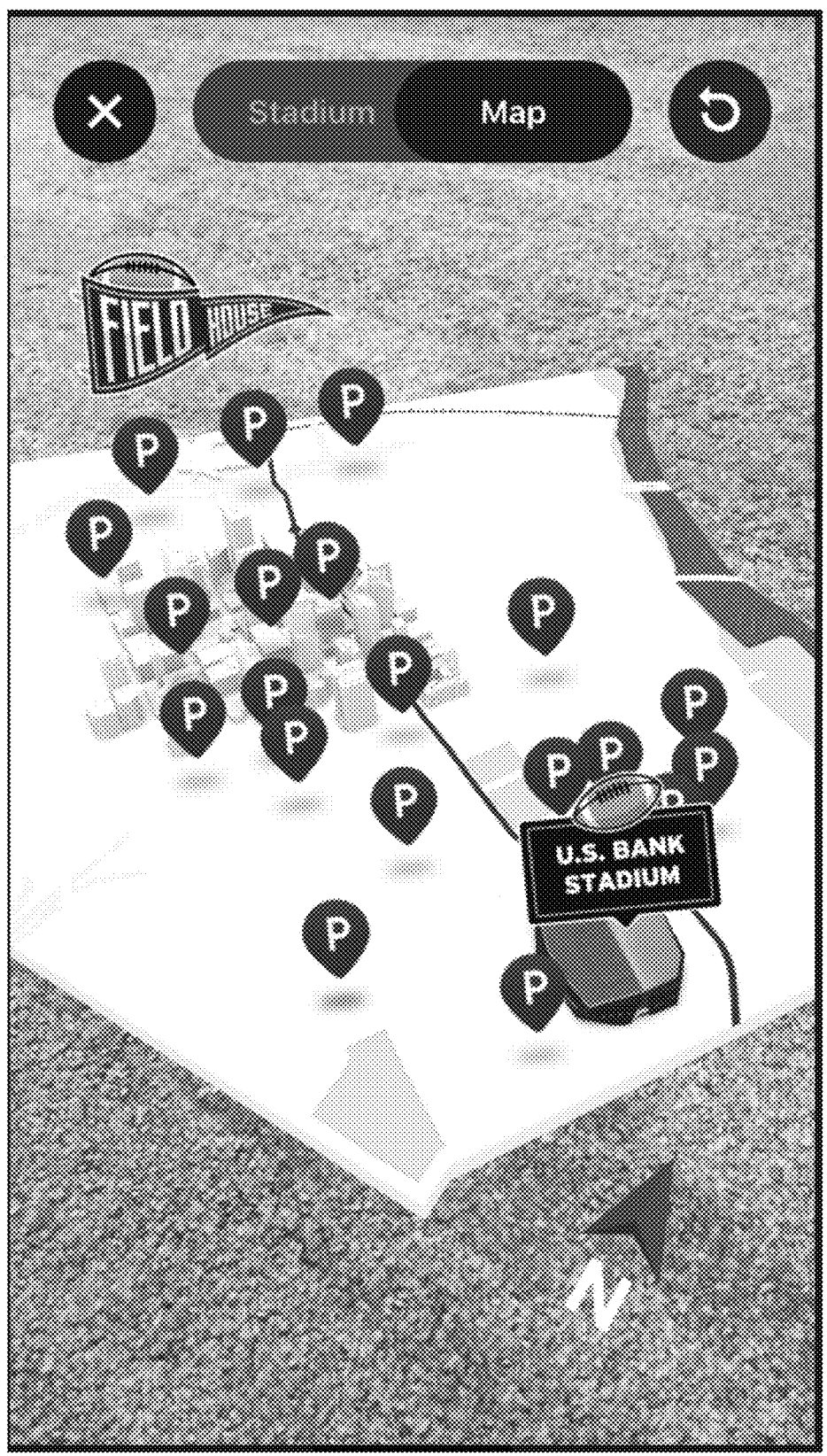
Figure 23:
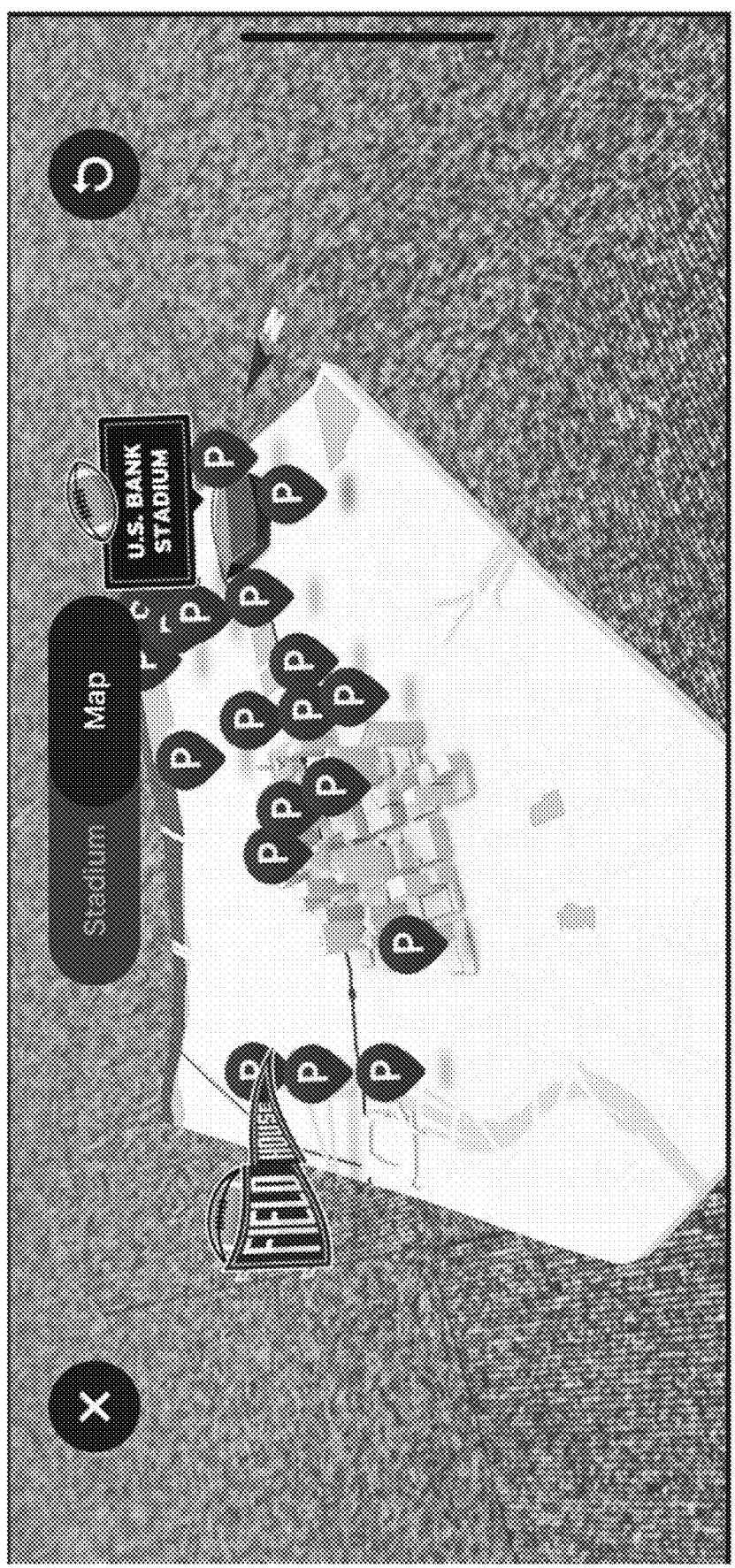
Figure 24:
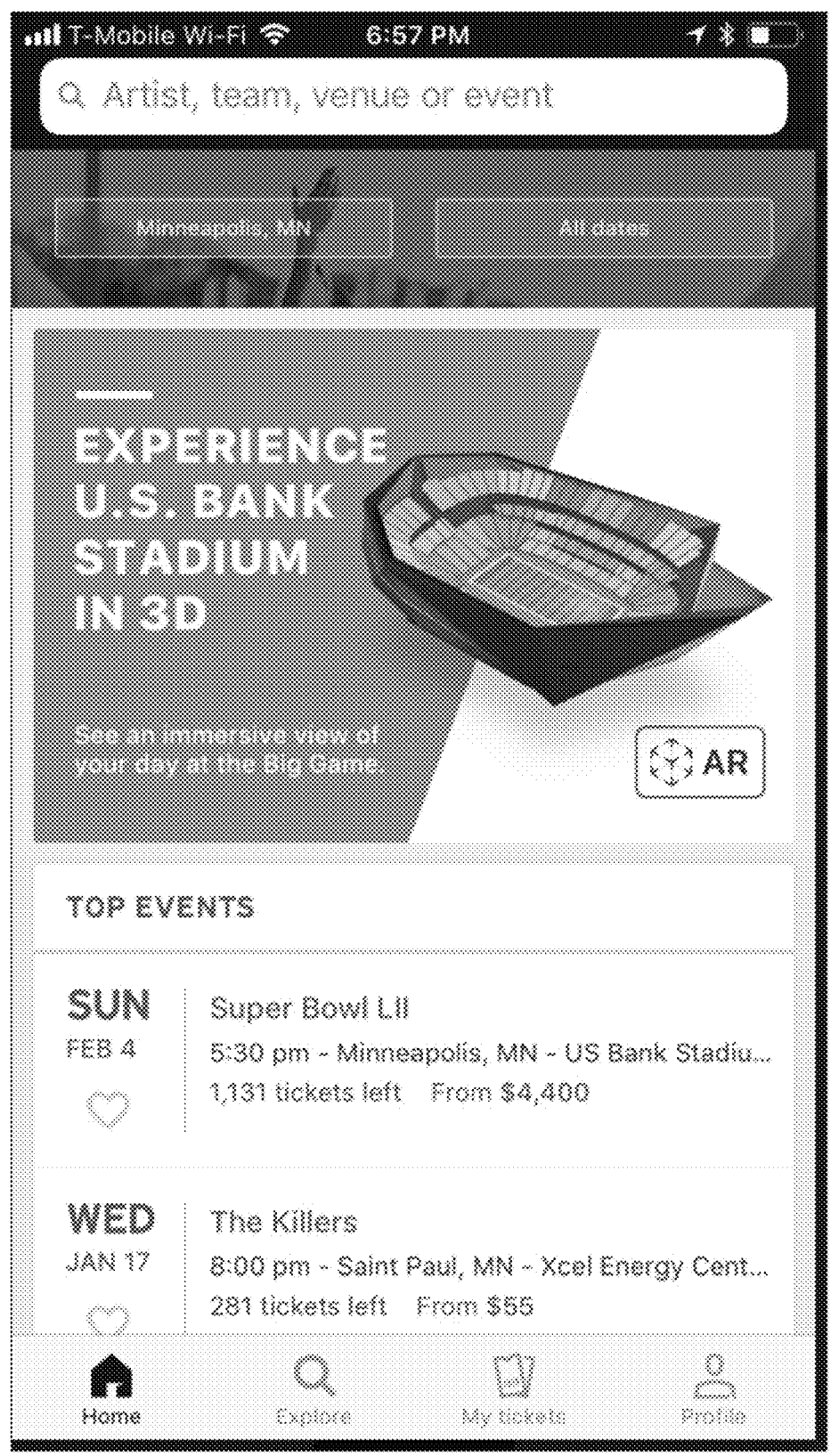
Figure 25:
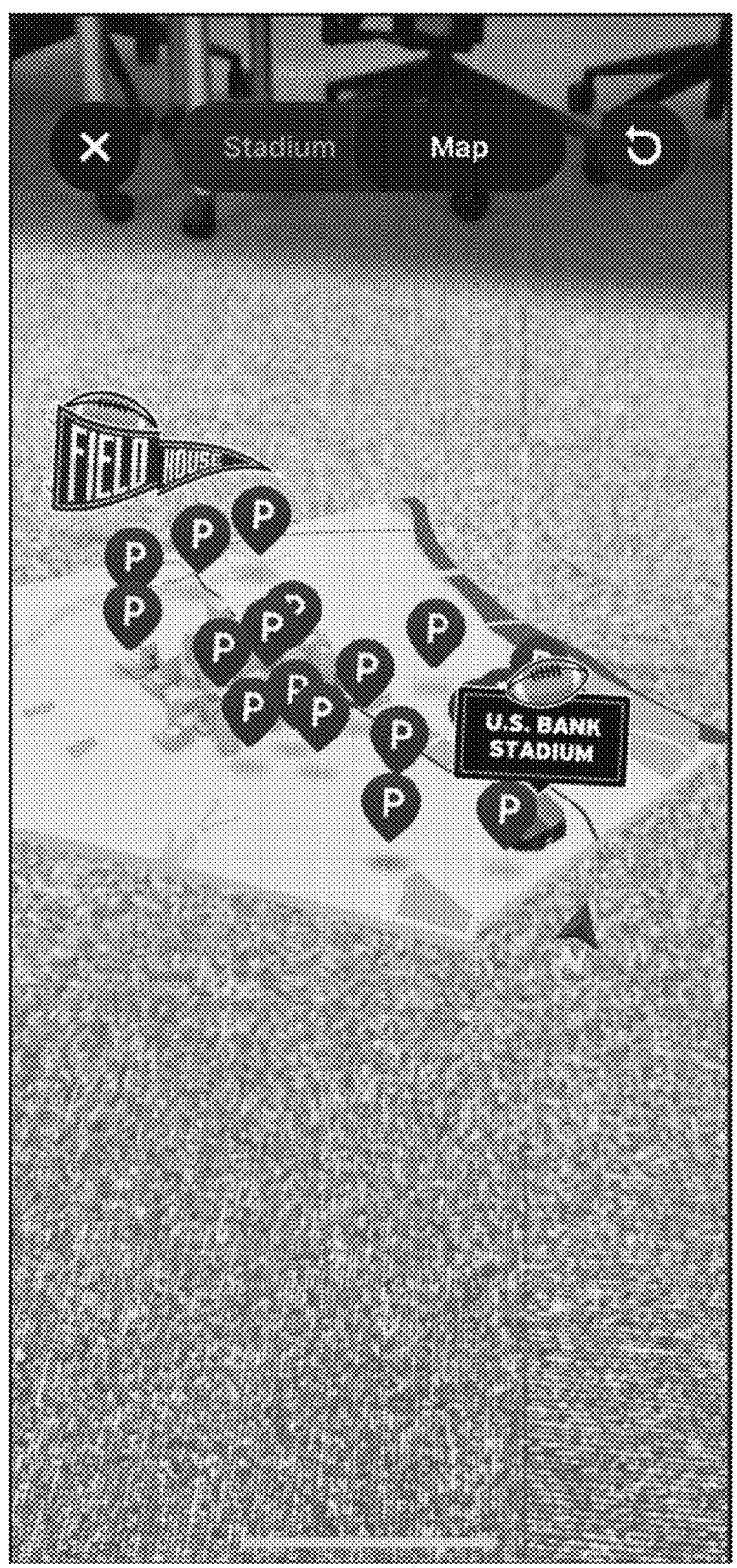
Figure 26:
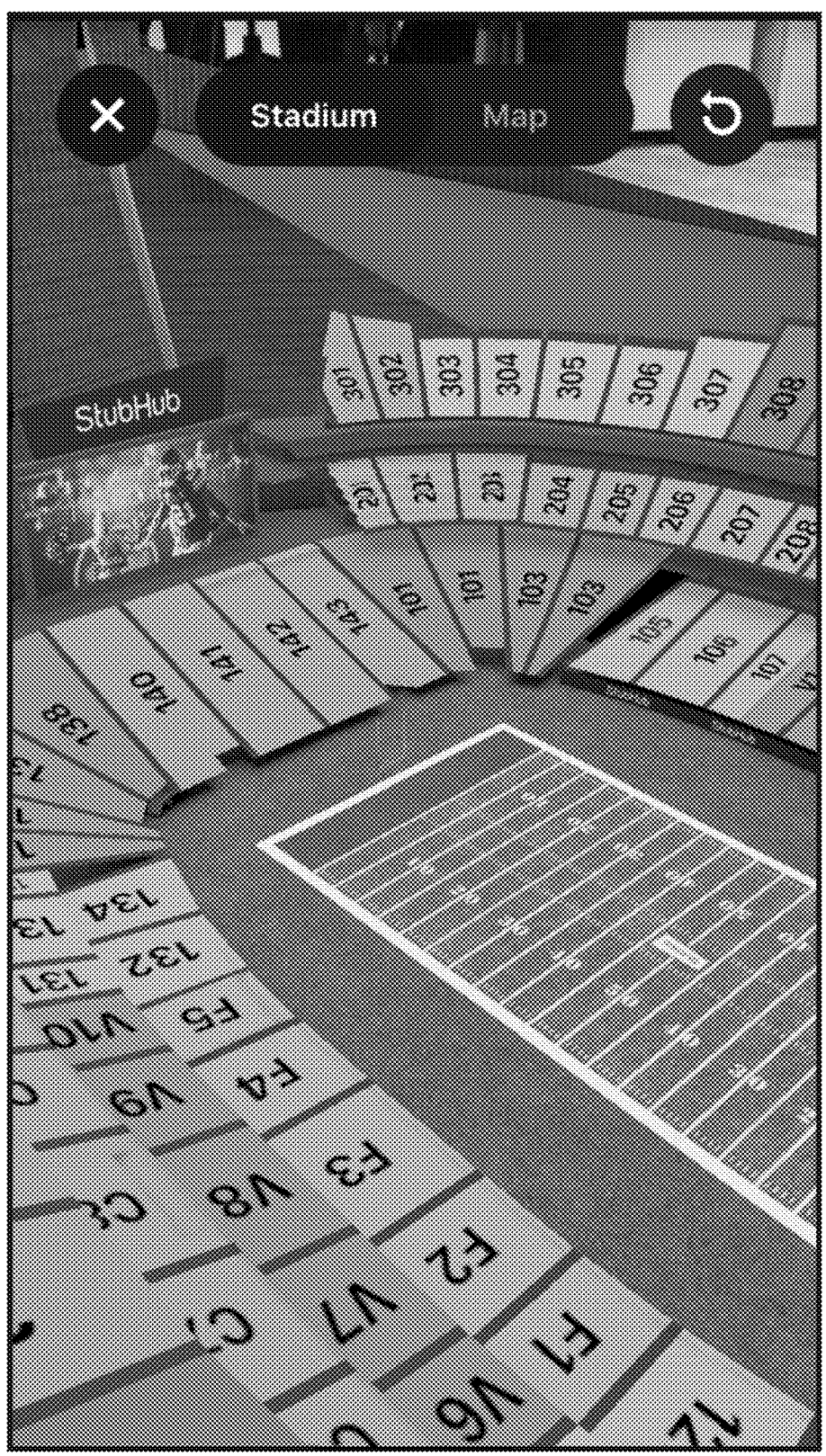
Figure 27:
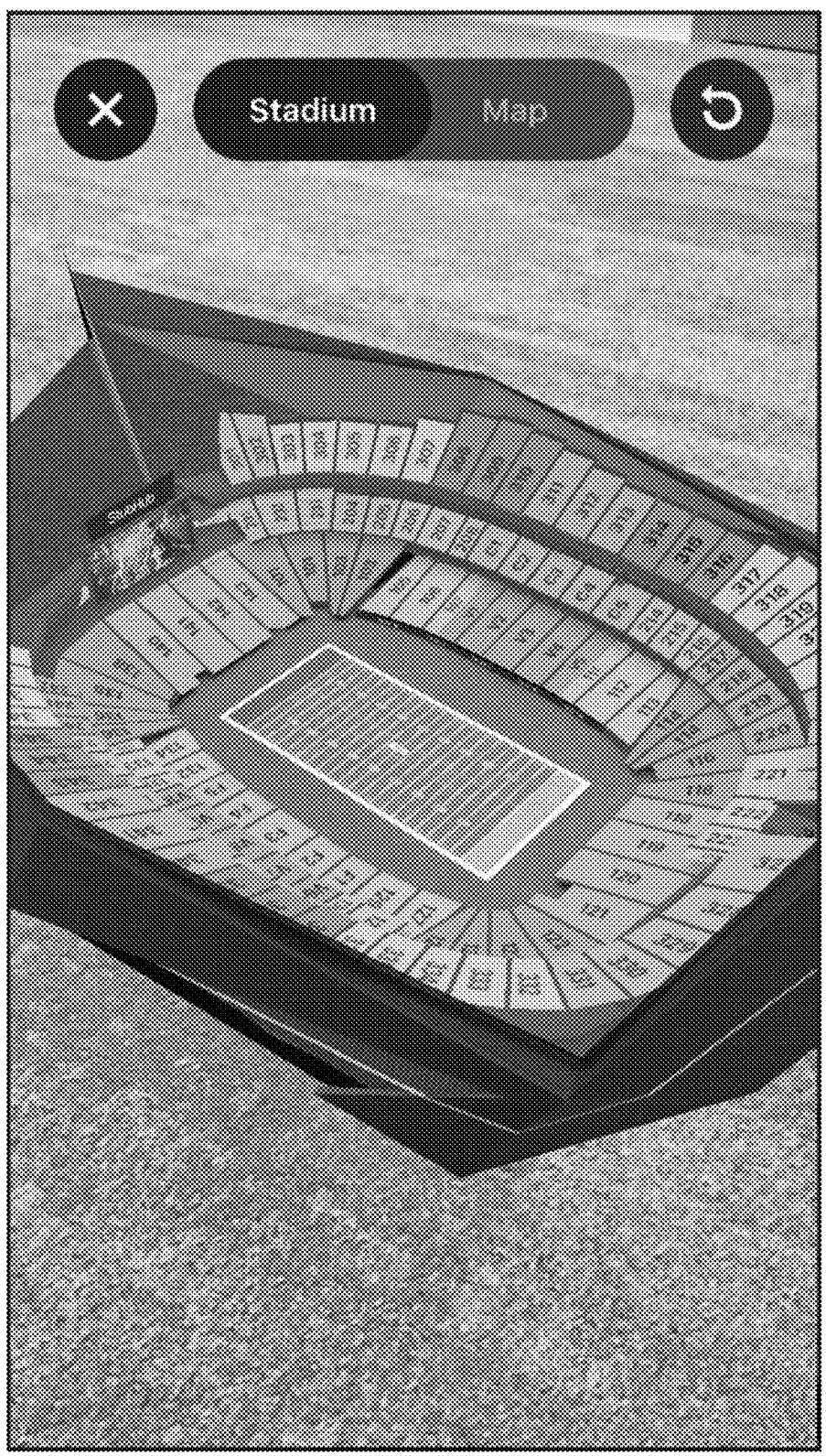
Figure 28:
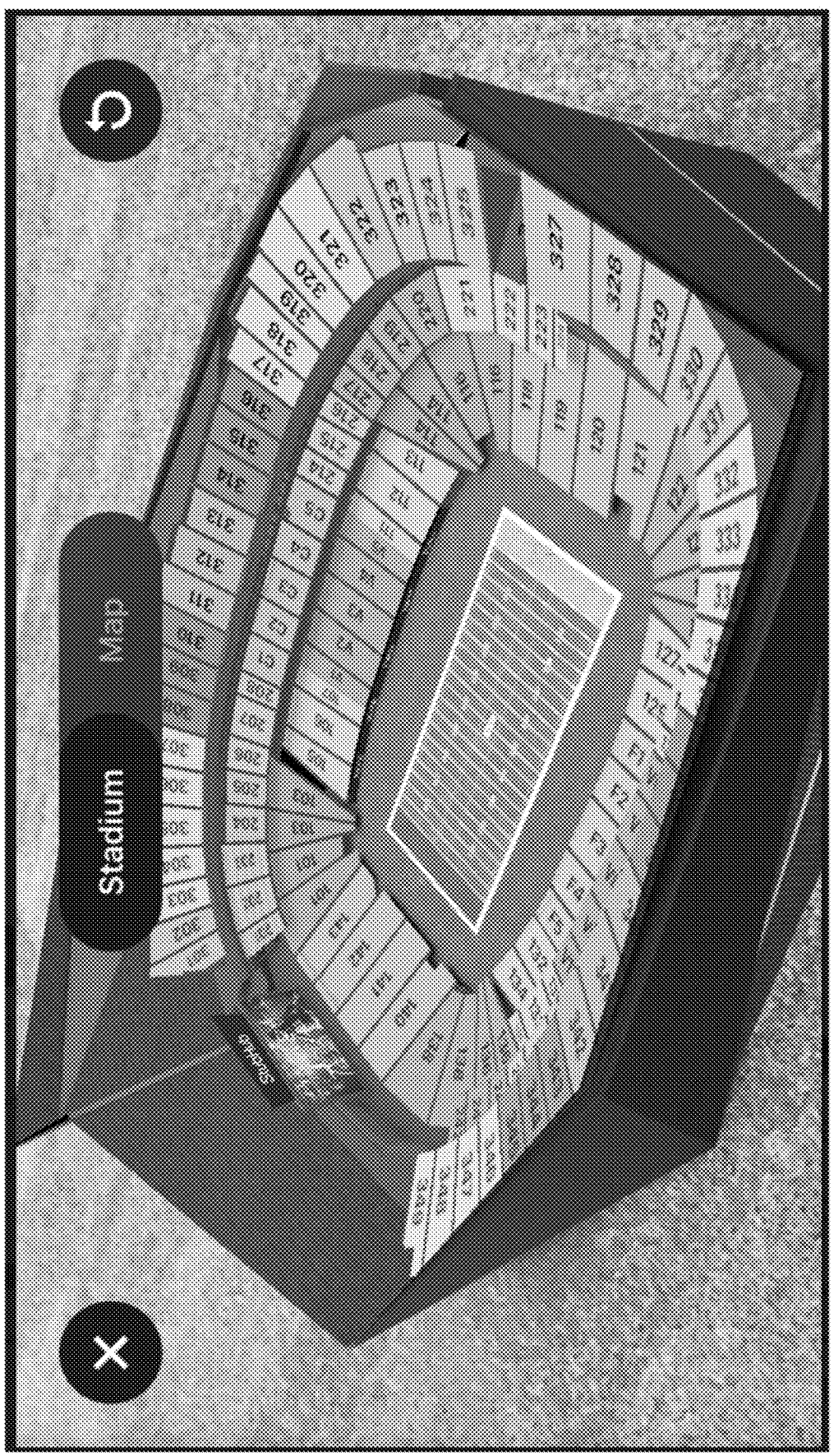

FIG. 9 depicts a system 900 showing operation of the location determination system 120 in greater detail as generating AR digital content 126 based on a determined location 202 of FIG. 2. In this system 900, access of the location determination system 120 to data that is not accessible in conventional systems is shown. The location determination system 120, for instance, this access includes 2D maps 902, 3D maps 904, and 360-degree views of the physical environment 108 including the stadium and surrounding areas. Conventionally, these items were accessible via different applications and devices and thus involved modal interaction.

The location determination system 120 also includes access to digital images 114 captured by the digital camera 112, e.g., as part of a "live stream." Access to the digital ticket 208 is also permitted, which may include functionality usable to permit user access to the physical environment (e.g., a bar code, QR code), data describing where such access is permitted (e.g., suite number, seat number, section number, level, parking spot, field access), and so forth. This is used by the location determination system 120 to generate AR digital content 126, which is not possible in conventional systems.

As shown in FIGS. 10-28, for instance, the AR digital content 126 may be generated to appear on a defined surface (e.g., flat surface) that is viewable by the user along with a view of a physical environment of the user, e.g., a direct view or recreated indirectly by a display device. In this way, the AR digital content 126 appears as disposed within an actual physical environment 108 of the user 104.

The digital camera 112, for instance, may be used to generate digital images 114 which are then examined by the camera platform manager module 116 to identify landmarks (e.g., a flat plane), on which, the AR digital content 126 is to be rendered to appear as if actually disposed in the user's physical environment 108. Visual characteristics are then used indicate correspondence of different sections between different views accessible as part of the AR digital content 126, e.g., the 2D maps 902, 3D maps 904, and 360-degree view 906. In this way, correlation of different parts of these rendered digital content may be readily and efficiency determined by the user, which is not possible in the conventional fractured techniques used to determine location.

A launch point, for instance, of the location determination system 120 in the user interface may start with a rendering of a 2D map 902. A user may then browser for tickets and see color coding of section or other visual differentiation techniques. An option is selectable to then cause output of a 3D maps 904 as rendered as part of AR digital content 126. The location determination system 120, for instance, may render the AR digital content 126 in response to detected motions of the user to appear to "fly over" different locations of the maps. This may be used to locate a car park, the relationship of the car park to a ticket pickup location and associated event (e.g., a "pregame" or tailgate party), and a relationship of the ticket pickup location and event to the actual stadium and location within the stadium that is accessible via the digital ticket 908, e.g., a particular physical seat at which rights are purchased to observe the event at a stadium. As illustrated, placement pins may be used to indicate particular locations, characteristics of those locations, and suggested physical navigation between the locations.

As part of this interaction, the location determination system 120 may also support output of digital marketing content. The digital marketing content, for instance, may advertise other events that are scheduled to occur at the stadium, items available for purchase, and so forth. This may be performed as a standalone screen or as part of a live feed through configuration as AR digital content.

A ticket provider, for instance, may sell tickets that are scattered about a city, as opposed to just a ring around a stadium. Accordingly, markers may be used to indicate these locations, such as lots that will be available to customers. Each of those markers may be configured as a pin that appears to float in the air above the parking lot. Upon detection of a user input selecting the marker, the location determination system 120 generates AR digital content 126, which indicates a location of the lot, the name of the lot if it has a branded name or a business name, and a link that is selectable to obtain directions to the parking lot.

Markers are also positioned above the stadium itself to indicate game time, the address and name of the place, and the teams that will be playing there that day. Another positional marker for ticket pickup outside a venue (e.g. a baseball stadium) and event locations are displayed. Additionally, information about public transportation options to and near the venue—metros or buses for instance—as well as information about using these transportation options may be provided. The AR digital content 126 may also include ticket purchase information, hours of venue operation, and so forth. In this way, the location determination system 120 may configure AR digital content 126 to leverage additional data in a context of an event in order to facilitate ticket purchases and enable effective user navigation within a venue that holds the event.

In a first example, the location determination system 120 completes a venue map and venue area map in the location of a user 104, like a train, home, office, it does not matter, e.g., on a flat surface. Visual characteristics such as color-coding, which indicates correspondence between maps, e.g., different ticketing sections are included in the AR digital content 126. Also, a status of inventory (e.g., available tickets) may be used to indicate tickets available for purchase to the user in real-time based on a live dataset. Such information is also rendered in the AR digital content 126. Therefore, users are provided up-to-date, up-to-the-minute information and data on ticket availability.

In another example, once the user purchases a ticket or reserves a ticket, the location determination system 120 is used to view a generated 3D map based on the purchased ticket. Specifically, the 3D map depicts the section in which the user's seat is located and/or the user's seat itself with a positional pin or indicator, which informs the users of his seat location. That information can also be shared with other people and is helpful for the user upon arriving at the stadium. The system may also allow users to trigger a purchase flow by selecting sections or from within the AR digital content.

In a further example, interaction within different sections is supported to trigger a virtual view mode. A user, for instance, may locate a section, tap on it, and then be brought into a 360-degree virtual view that includes the above features. In other words, a user may invoke that view from within the AR view. As such, there are two different types of 3D experiences such that one is nested inside the other. For instance, a user may start with a bird's eye view of a 3D map 204, then tap a section to cause output of a 360-degree view 206 that gives an appearance as if a user was actually sitting in that section. The user may then zoom back out and see the whole stadium at one time.

In yet another example, location information is used to provide contextual help to the user in order to assist in navigation. This may include assisting a user in locating a seat or other access as specified by the digital ticket 208. This may also be leveraged to provide contextual information, such as to suggest a bathroom, concessions, and other items closer to a person's seat, rather than based on a user's current position. Such assistance may also include routes from a parking lot, pre-events, and other ticket related information, all of which serves to guide user navigation.

A user, for instance, may pull into a parking lot and open an app to determine which way to walk to get to a seat the fastest, or where the closest bathroom or hotdog stand is to his seat, the fastest way in and out of the venue, and so forth. In this way, knowledge of the digital ticket 208 and seat location is more persistent and allows users to use their camera lenses to get way-finding signage that helps user orient themselves as they navigate to locations within the venue.

An additional example of social presence functionality is employed. If a user, for instance, bought a ticket for an event and someone else that known to that user has also bought a ticket to the same event, digital ticket 208 information may be leveraged, such as to locate each other's seats. This includes as an overlay of AR digital content 126 ae part of a live camera feed. A user, for instance, may open an app, hold up the phone, and pan it across the stands to view a marker that indicates where a friend "is sitting." This may also be used to leverage friends and other contacts as part of social media to see "where your friends, if any, are at."

For instance, if a first user has a ticket and a second user has a ticket, social data may be shared to find a common meeting place based on user preferences. And with facial recognition, the camera platform manager module 116 may indicate when a person is detected in a crowd. The location determination system 120, for instance, may detect when a person is within range of a particular location and then activate the object recognition portion of the camera to identify this person.

In yet another example, digital images 114 are used as part of a live camera feed and object recognition to determine positional locations. These markers improve the navigational accuracy in stadiums and other venues, which are difficult to navigate using conventional position determining functionalities due to lack of a signal. For example, object recognition of a sign or banner may be leveraged to indicate a user's position within a 3D model configured as AR digital content 126. This may also help resolve problems with determining position along a "z" axis.

Example System and Device

FIG. 29 illustrates an example system generally at 2900 that includes an example computing device 2902 that is representative of one or more computing systems and/or devices that may implement the various techniques described herein. This is illustrated through inclusion of the camera platform manager module 116. The computing device 2902 may be, for example, a server of a service provider, a device associated with a client (e.g., a client device), an on-chip system, and/or any other suitable computing device or computing system.

The example computing device 2902 as illustrated includes a processing system 2904, one or more computer-readable media 2906, and one or more I/O interface 2908 that are communicatively coupled, one to another. Although not shown, the computing device 2902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2904 is representative of functionality to perform one or more operations using hardware. Accordingly, the processing system 2904 is illustrated as including hardware element 2910 that may be configured as processors, functional blocks, and so forth. This may include implementation in hardware as an application specific integrated circuit or other logic device formed using one or more semiconductors. The hardware elements 2910 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2906 is illustrated as including memory/storage 2912. The memory/storage 2912 represents memory/storage capacity associated with one or more computer-readable media. The memory/storage component 2912 may include volatile media (such as random-access memory (RAM)) and/or nonvolatile media (such as read only memory (ROM), Flash memory, optical disks, magnetic disks, and so forth). The memory/storage component 2912 may include fixed media (e.g., RAM, ROM, a fixed hard drive, and so on) as well as removable media (e.g., Flash memory, a removable hard drive, an optical disc, and so forth). The computer-readable media 2906 may be configured in a variety of other ways as further described below.

Input/output interface(s) 2908 are representative of functionality to allow a user to enter commands and information to computing device 2902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2910 and computer-readable media 2906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2910. The computing device 2902 may be configured to implement particular instructions and/or functions corresponding to the software and/or hardware modules. Accordingly, implementation of a module that is executable by the computing device 2902 as software may be achieved at least partially in hardware, e.g., through use of computer-readable storage media and/or hardware elements 2910 of the processing system 2904. The instructions and/or functions may be executable/operable by one or more articles of manufacture (for example, one or more computing devices 2902 and/or processing systems 2904) to implement techniques, modules, and examples described herein.

The techniques described herein may be supported by various configurations of the computing device 2902 and are not limited to the specific examples of the techniques described herein. This functionality may also be implemented all or in part through use of a distributed system, such as over a "cloud" 2914 via a platform 2916 as described below.

The cloud 2914 includes and/or is representative of a platform 2916 for resources 2918. The platform 2916 abstracts underlying functionality of hardware (e.g., servers) and software resources of the cloud 2914. The resources 2918 may include applications and/or data that can be utilized while computer processing is executed on servers that are remote from the computing device 2902. Resources 2918 can also include services provided over the Internet and/or through a subscriber network, such as a cellular or Wi-Fi network.

The platform 2916 may abstract resources and functions to connect the computing device 2902 with other computing devices. The platform 2916 may also serve to abstract scaling of resources to provide a corresponding level of scale to encountered demand for the resources 2918 that are implemented via the platform 2916. Accordingly, in an interconnected device embodiment, implementation of functionality described herein may be distributed throughout the system 2900. For example, the functionality may be implemented in part on the computing device 2902 as well as via the platform 2916 that abstracts the functionality of the cloud 2914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for navigating large venues, the method comprising:
    detecting, by a computing device, an inability of wireless position determining functionality of the computing device to determine an accurate location of a physical environment in which the computing device is disposed due to lack of signal;
    responsive to the detecting, capturing at least one digital image of the physical environment using a digital camera of the computing device;
    identifying, by the computing device, an object from the at least one digital image using a machine-learning model as a classifier as part of object recognition;
    outputting text by the classifier based on the object recognition of the identified object;
    determining, by the computing device, a location of the identified object in relation to a digital map of the physical environment, the determining including using the output text as a search query as part of natural language understanding using machine learning by a natural language processing system;
    determining, by the computing device, a current location of the computing device in relation to the location on the digital map;
    determining, by the computing device, contextual information associated with a digital ticket;
    generating, by the computing device, navigation from the current location to a desired location based on the contextual information associated with the digital ticket and the digital map; and
    displaying, by the computing device, the current location of the computing device and the navigation to the desired location on the digital map.

2. The method as described in claim 1, wherein the wireless position determining functionality is operable as part of a Global Positioning System (GPS).

3. The method as described in claim 1, wherein the wireless position determining functionality is operable based on triangulation of the signal.

4. The method as described in claim 3, wherein the signal is a cellular signal.

5. The method as described in claim 1, wherein the displaying of the digital map is performed using AR/VR digital content.

6. The method as described in claim 1, wherein the displaying of the digital map is performed as part of a live camera feed from the digital camera.

7. The method as described in claim 1, wherein the identifying further includes identifying text associated with the object using optical character recognition.

8. The method as described in claim 7, wherein the determining the current location is further performed by using the text associated with the object as part of the search query of the digital map.

9. The method as described in claim 7, wherein the identifying the text associated with the object further includes determining what is being expressed by the text via the natural language processing system.

10. A method for navigating large venues, the method comprising:
    capturing, by a computing device, at least one digital image of a physical environment in which the computing device is disposed using a digital camera;
    identifying, by the computing device, an object from the at least one digital image using a machine-learning model as a classifier as part of object recognition;
    outputting text by the classifier based on the object recognition of the identified object;
    determining, by the computing device, a location of the identified object in relation to a digital map of the physical environment, the determining including using the text output by the classifier as a search query as part of natural language understanding by a natural language processing system;
    determining, by the computing device, a current location of the computing device in relation to the object on the digital map;
    determining, by the computing device, contextual information associated with a digital ticket;
    generating, by the computing device, navigation from the current location to a desired location based on the contextual information associated with the digital ticket and the digital map; and
    displaying, by the computing device, the current location of the computing device and the navigation to the desired location on the digital map.

11. The method as described in claim 10, wherein the capturing is performed responsive to detecting an inability of wireless position determining functionality of the computing device to determine an accurate location due to lack of signal and the wireless position determining functionality is operable as part of a Global Positioning System (GPS).

12. The method as described in claim 10, wherein the capturing is performed responsive to detecting an inability of wireless position determining functionality of the computing device to determine an accurate location due to lack of signal and the wireless position determining functionality is operable based on triangulation of the signal.

13. The method as described in claim 12, wherein the signal is a cellular signal.

14. The method as described in claim 10, wherein the displaying of the digital map is performed using AR/VR digital content.

15. The method as described in claim 10, wherein the displaying of the digital map is performed as part of a live camera feed from the digital camera.

16. A computing device comprising:
    wireless position determining functionality;
    a digital camera;
    a processing system; and
    a computer-readable storage medium having instructions stored thereon that, responsive to execution by the processing system, causes the processing system to perform operations including:
        capturing at least one digital image of a physical environment in which the computing device is disposed using the digital camera;

identifying an object from the at least one digital image using a machine-learning model as a classifier as part of object recognition;
outputting text by the classifier based on the object recognition of the identified object;
determining a location of the identified object in relation to a digital map of the physical environment, the determining including using the text output by the classifier as a search query as part of natural language understanding by a natural language processing system;
determining a current location of the computing device in relation to the object on the digital map;
determining contextual information associated with a digital ticket;
generating navigation from the current location to a desired location based on the contextual information associated with the digital ticket and the digital map; and
displaying the location of the computing device and the navigation to the desired location on the digital map.

17. The computing device as described in claim 16, wherein the capturing is performed responsive to detecting an inability of wireless position determining functionality of the computing device to determine an accurate location due to lack of signal and the wireless position determining functionality is operable as part of a Global Positioning System (GPS).

18. The computing device as described in claim 16, wherein the capturing is performed responsive to detecting an inability of wireless position determining functionality of the computing device to determine an accurate location due to lack of signal and the wireless position determining functionality is operable based on triangulation of the signal.

19. The computing device as described in claim 16, wherein the displaying of the digital map is performed using AR/VR digital content.

* * * * *